United States Patent
Hoshino et al.

(10) Patent No.: US 7,059,733 B2
(45) Date of Patent: Jun. 13, 2006

(54) DISPLAY APPARATUS

(75) Inventors: Takeshi Hoshino, Kodaira (JP); Youichi Horii, Mitaka (JP); Rieko Otsuka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/785,051

(22) Filed: Feb. 25, 2004

(65) Prior Publication Data

US 2004/0196362 A1  Oct. 7, 2004

(30) Foreign Application Priority Data

Mar. 18, 2003  (JP) .............................. 2003-073371
Feb. 5, 2004  (JP) .............................. 2004-028798

(51) Int. Cl.
*G03B 21/00* (2006.01)
*G02B 26/02* (2006.01)
*G09F 19/00* (2006.01)
*G09F 11/02* (2006.01)

(52) U.S. Cl. .................. 353/122; 353/38; 353/102; 40/430; 40/473; 40/484; 40/493; 359/236

(58) Field of Classification Search ................ 353/122, 353/38, 46, 79, 102; 40/430, 440, 456, 473, 40/479, 484, 493; 359/224, 236, 462, 739; 382/173, 174; 345/4–6
See application file for complete search history.

(56) References Cited

U.S. PATENT DOCUMENTS 5,695,346 A * 12/1997 Sekiguchi et al. .......... 434/365
6,208,318 B1 * 3/2001 Anderson et al. ............ 345/1.1

FOREIGN PATENT DOCUMENTS

| JP | 6-301019 | 4/1993 |
| JP | 11-258697 | 3/1998 |
| JP | 2001-103515 | 9/1999 |
| JP | 2002-027504 | 7/2000 |
| JP | 2002-271820 | 3/2001 |

* cited by examiner

*Primary Examiner*—W. B. Perkey
*Assistant Examiner*—Rochelle Blackman
(74) *Attorney, Agent, or Firm*—Reed Smith LLP; Stanley P. Fisher, Esq.; Juan Carlos A. Marquez, Esq.

(57) ABSTRACT

A display apparatus is provided which can display different text/image information depending on the viewing angle and the viewer, display a high reality three-dimensional image viewable from any direction and realize stereoscopic viewing without glasses or the like. The display apparatus includes a display unit having a view angle-limiting filter on its surface, a rotary mechanism to rotate the display unit and a control unit which implements control so that when the display unit, rotated by the rotary mechanism, is faced to each of plural directions, the display unit displays a different text/image content associated with the direction.

9 Claims, 34 Drawing Sheets

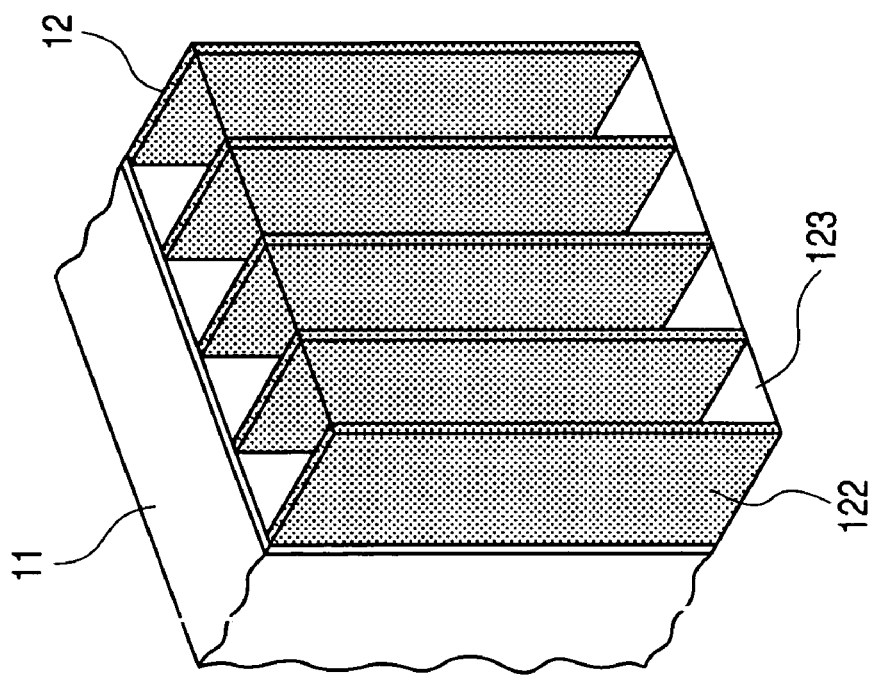
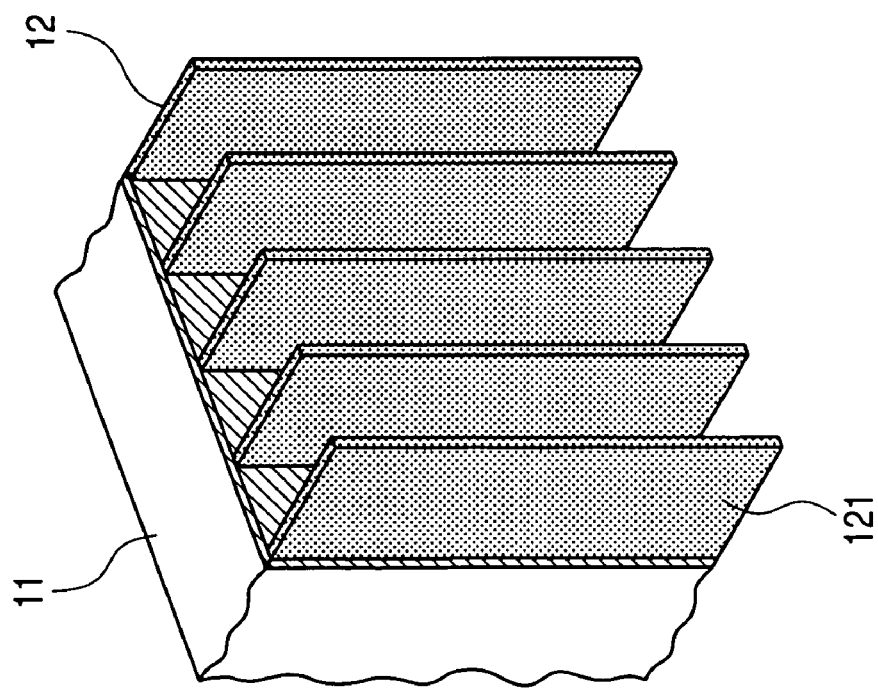

FIG. 23(a)
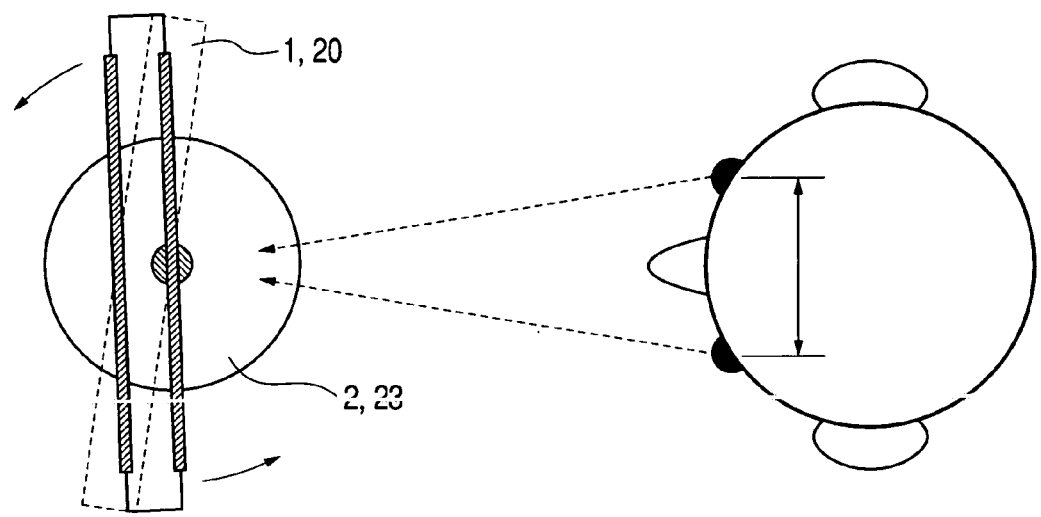
FIG. 23(b)
IMAGE VIEWED BY LEFT EYE
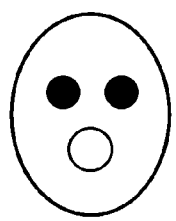
IMAGE VIEWED BY RIGHT EYE

FIG. 36
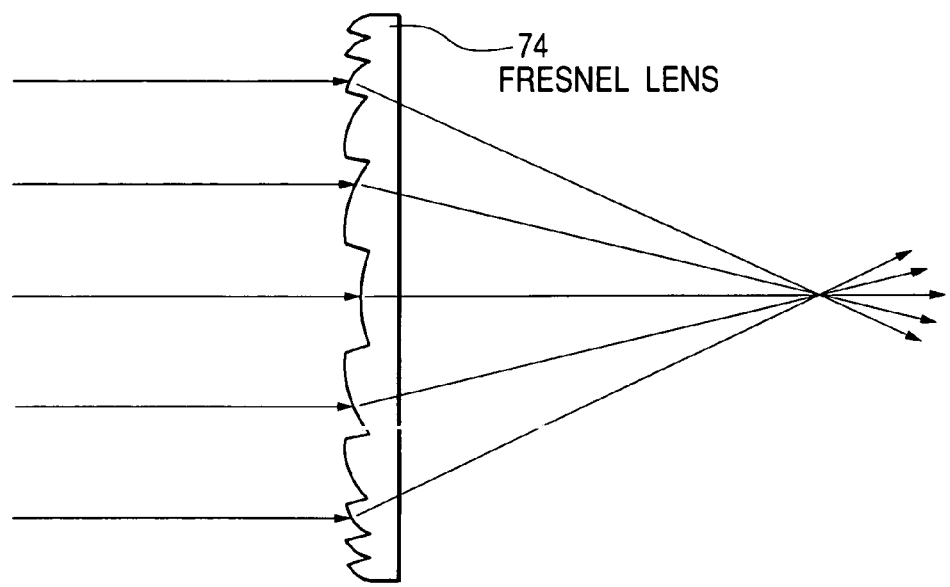
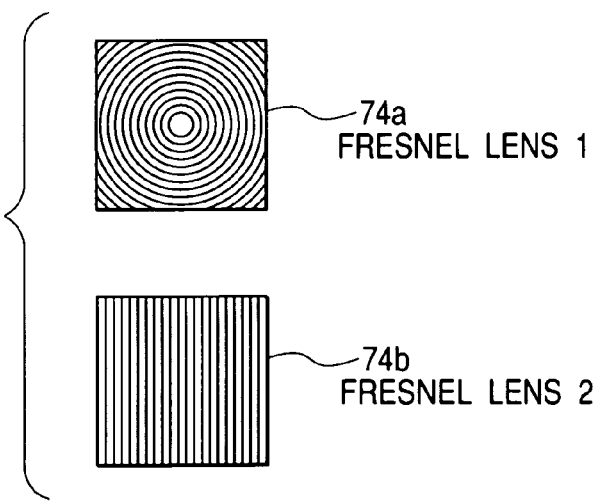
FIG. 37

DISPLAY APPARATUS

BACKGROUND OF THE INVENTION

The present invention relates to a display apparatus which is intended for use in stations, shopping centers and other public spaces and provides information viewable from any direction and relates to a display apparatus which provides an image viewable as a three-dimensional image by persons moving around the apparatus.

Information provided from conventional display apparatus placed in public and other sites can be viewed only from specific directions.

In Japanese Patent Laid-open No. 6-301019, a display apparatus is described wherein a single filter having both a view angle-limiting function and a heating function is introduced to minimize the deterioration of display elements in brightness.

SUMMARY OF THE INVENTION

It is an object of the present invention to provide a display apparatus capable of displaying different text or image information depending on the viewing angle and the viewer.

It is another object of the present invention to provide a display apparatus capable of providing a high reality three-dimensional image to persons therearound.

It is yet another object of the present invention to provide a display apparatus capable of realizing stereoscopic viewing without the necessity of wearing glasses, etc.

It is still another object of the present invention to provide an image pickup apparatus capable of picking up images of an object from a plurality of directions at a time for use in display apparatus and provide a display apparatus capable of three-dimensional image communication with this image pickup apparatus.

It is still another object of the present invention to provide a display apparatus having such interacting capabilities as to change the displayed image if a person approaches or moves a hand.

According to an aspect of the present invention, there is provided a display apparatus comprising: a display unit having a view angle-limiting filter on a surface thereof; a rotary mechanism which rotates the display unit; and control unit for implementing control so that when the display unit, rotated by the rotary mechanism, is faced to each of plural directions, the display unit displays a different text or image content associated with the direction.

According to another aspect of the present invention, there is provided a display apparatus comprising: a display unit having a view angle-limiting filter on a surface thereof; a rotary mechanism which rotates the display unit; a detection unit for detecting a direction extending through a viewer; and a control unit for implementing control so that when the display unit, rotated by the rotary mechanism, is faced to the detected direction extending through a viewer, the display unit displays a text or image content associated with the direction.

In the above-mentioned display apparatus, the display unit may be a display or a screen to which text or image information is projected by an electronic projector and the control unit may have a memory unit in which the text or image information to be displayed by the display unit is stored.

According to yet another aspect of the present invention, there is provided a display apparatus comprising: a screen having a view angle-limiting filter on a surface thereof; a rotary mechanism which rotates the screen; and an electronic projector which when the screen, rotated by the rotary mechanism, is faced to each of plural directions, projects a different text or image content associated with the direction to the screen.

According to still another aspect of the present invention, there is provided a display apparatus comprising: a screen having a view angle-limiting filter on a surface thereof; a rotary mechanism which rotates the screen; an electronic projector which projects an image comprising a plurality of different text or image contents; and a projection optical system by which the image projected from the electronic projector is divided into the plurality of different text or image contents and each of the plurality of different text or contents is projected to the screen when the screen, rotated by the rotary mechanism, is faced to the associated one of plural directions.

The present invention is characterized in that a three-dimensional image is formed by the plurality of different text or image contents.

The present invention is characterized by providing an acquiring unit for acquiring the content to be projected from the electronic projector so as to store the content in a memory unit, wherein the acquiring unit reads out the content stored in the memory unit so as to supply to the electronic projector.

The present invention is characterized in that the image pickup apparatus includes a reflection optical system comprising plural mirrors arranged circularly; and an image pickup device such as a camera is set up above the center of the mirror circle; wherein when an object is placed within the mirror circle, plural images of the object viewed from plural directions are reflected by the corresponding mirrors and picked up by the image pickup device as a circular array of images.

According to still another aspect of the present invention, there is provided a display apparatus characterized by comprising sensors such as proximity sensors set up around the apparatus; and a detection unit for detecting the position and movement of a viewer according to changes in the states of sensors through a control unit; wherein an image associated with the detected position or movement is read out from a memory unit and supplied to an electronic projector.

According to the present invention, it is possible to display different text/image contents to different directions.

According to the present invention, it is possible to display an image of an object according to each view direction. For example, it is possible to view its rear image if the viewer goes round to the rear of the display apparatus.

According to the present invention, it is possible to provide information in an intuitively easy-to-understand style. For example, in the case of road/passage guidance, information given to a person is consistent with his traveling direction at that time.

According to the present invention, it is also possible to provide a stereoscopic effect. The viewer can have stereoscopic vision without wearing glasses. A three-dimensional image can be viewed from any direction with this stereoscopic effect. This effect also functions when the image source is moving images obtained from a memory unit and can be enjoyed by plural persons simultaneously.

BRIEF DESCRIPTION OF THE DRAWINGS

FIGS. 6(a) and 6(b) are perspective views showing concrete examples of view angle-limiting filters attached to display surfaces;

in FIG. 7(a), the display screen is being viewed by a person right ahead of the display screen; and in FIG. 7(b), the person is viewing the display screen which has rotated a little;

FIGS. 8(a), 8(b) and 8(c) are diagrams for explaining a case where a maximum view angle is ±22.5 degrees, in which FIG. 8(a) shows the same case, FIG. 8(b) shows display intervals and off intervals, and FIG. 8(c) shows contents a to d viewable ranges;

FIGS. 9(a), 9(b) and 9(c) are diagrams for explaining a case where a maximum view angle is ±45 degrees, in which FIG. 9(a) shows the same case, FIG. 9(b) shows display intervals and off intervals, and FIG. 9(c) shows contents a to d viewable ranges;

FIGS. 23(a) and 23(b) are diagrams for explaining a stereoscopic display apparatus according to a third embodiment of the present invention;

FIG. 36 is a diagram showing the feature of the Fresnel lens;

FIG. 37 shows types of Fresnel lenses;

DETAILED DESCRIPTION OF THE PREFERRED EMBODIMENTS

Preferred embodiments of display apparatus according to the present invention will be described with reference to the drawings.

First Embodiment

Figure 1:
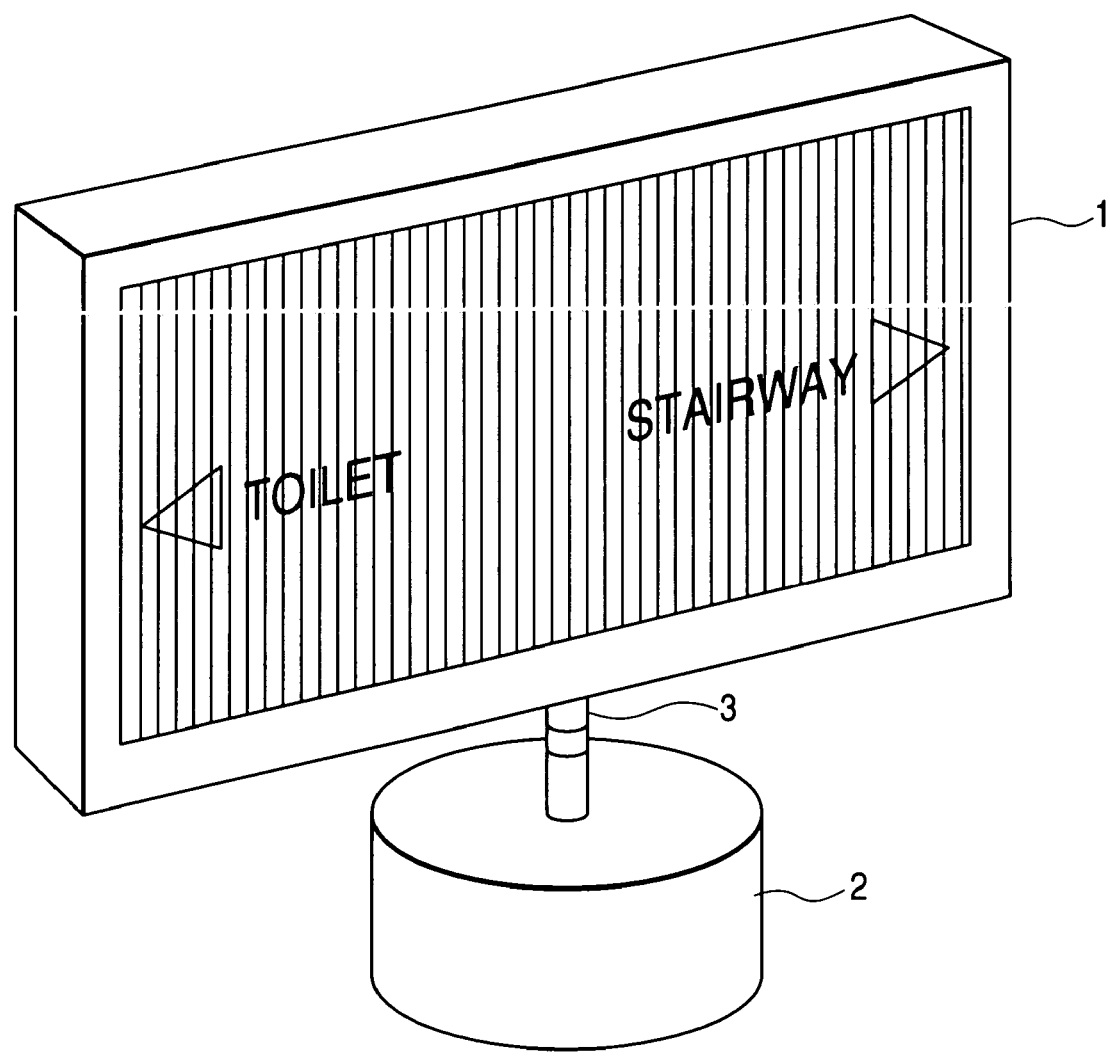
FIG. 1 is a perspective view of a display apparatus according to a first embodiment of the present invention.

Firstly, by using FIGS. 1 to 11, the following describes a first embodiment of a display apparatus according to the present invention, which is intended for use in public spaces, such as stations and shopping centers, for providing information viewable from any direction. FIG. 1 is a perspective view of the display apparatus according to the first embodiment of the present invention. In the first embodiment, text or image (graphic) information is displayed by a view angle-limited display unit 1 composed of a liquid crystal, plasma or some other thin-shaped display rotated by a rotary shaft 3 of a rotary mechanism 2. Text or image (graphic) information displayed at a time can be viewed only by the people who exist in front of the screen at that time. That is, the first embodiment is configured such that the display unit 1 provides different text or image information to individual viewers depending on the direction from which they view the display unit 1. Note that although in FIG. 1 the display unit 1 is shown as a single-display unit composed of a view angle-limited thin-shaped display, such as a liquid crystal or plasma display, it may also be configured by uniting two thin-shaped displays back to back. Further, three, four or more thin-shaped displays may also be united so as to form three, four or more-sided polygons rotated around the rotary drive shaft 3 when viewed from the direction of the rotary drive shaft 3. Although increasing the number of thin-shaped displays makes the cost higher, this brings about improvement in brightness and visibility since the same image can be viewed more than once per revolution. In addition, even if the screen switching speed is slow as is often the case with liquid crystal screens, visibility deterioration can be prevented. Further, this makes it possible to reduce the rotation speed of the display unit 1.

In the case of a liquid crystal display, it comprises a liquid crystal panel and a backlight.

Figure 2:
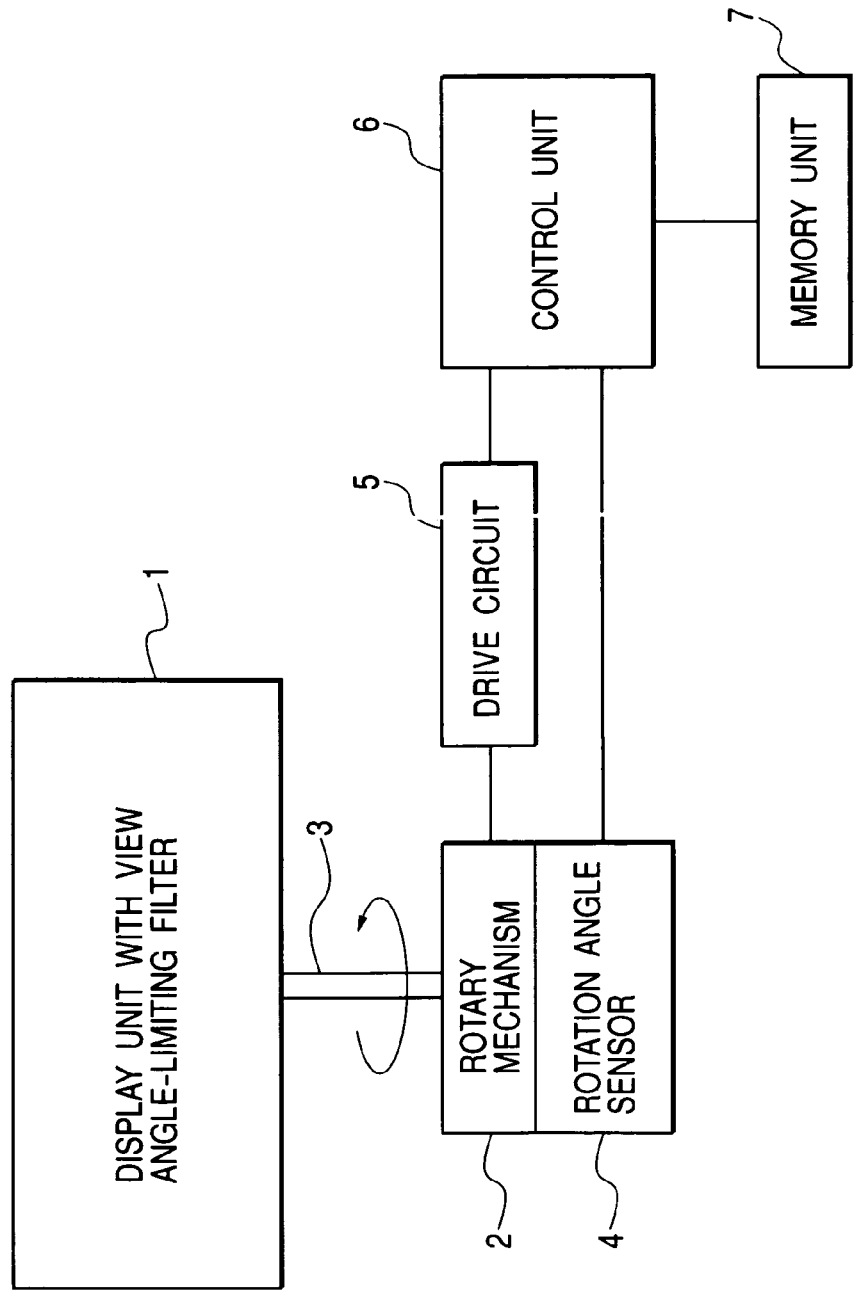
FIG. 2 is a general block diagram of the display apparatus of the first embodiment.
Figure 3:
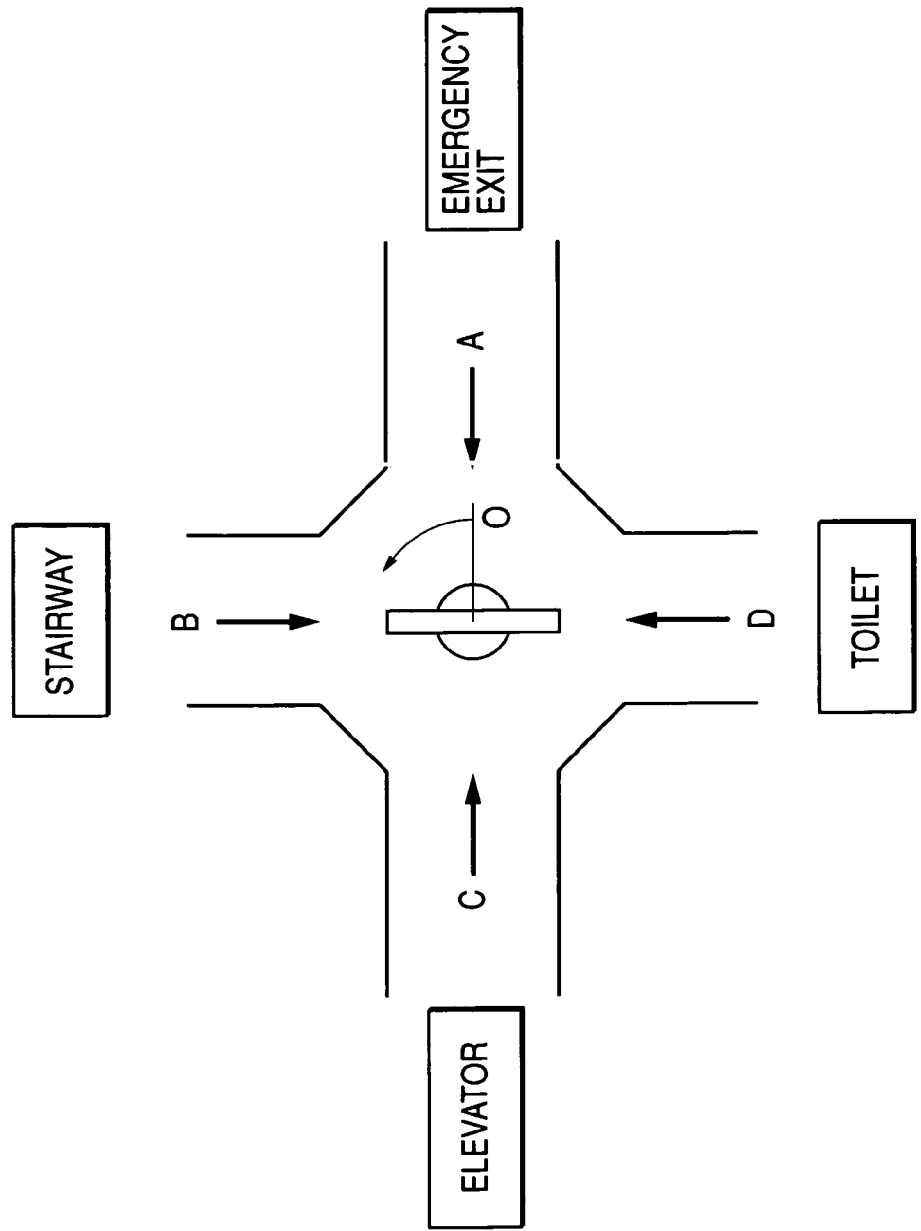
FIG. 3 is a diagram for explaining the passage guidance.
Figure 4:
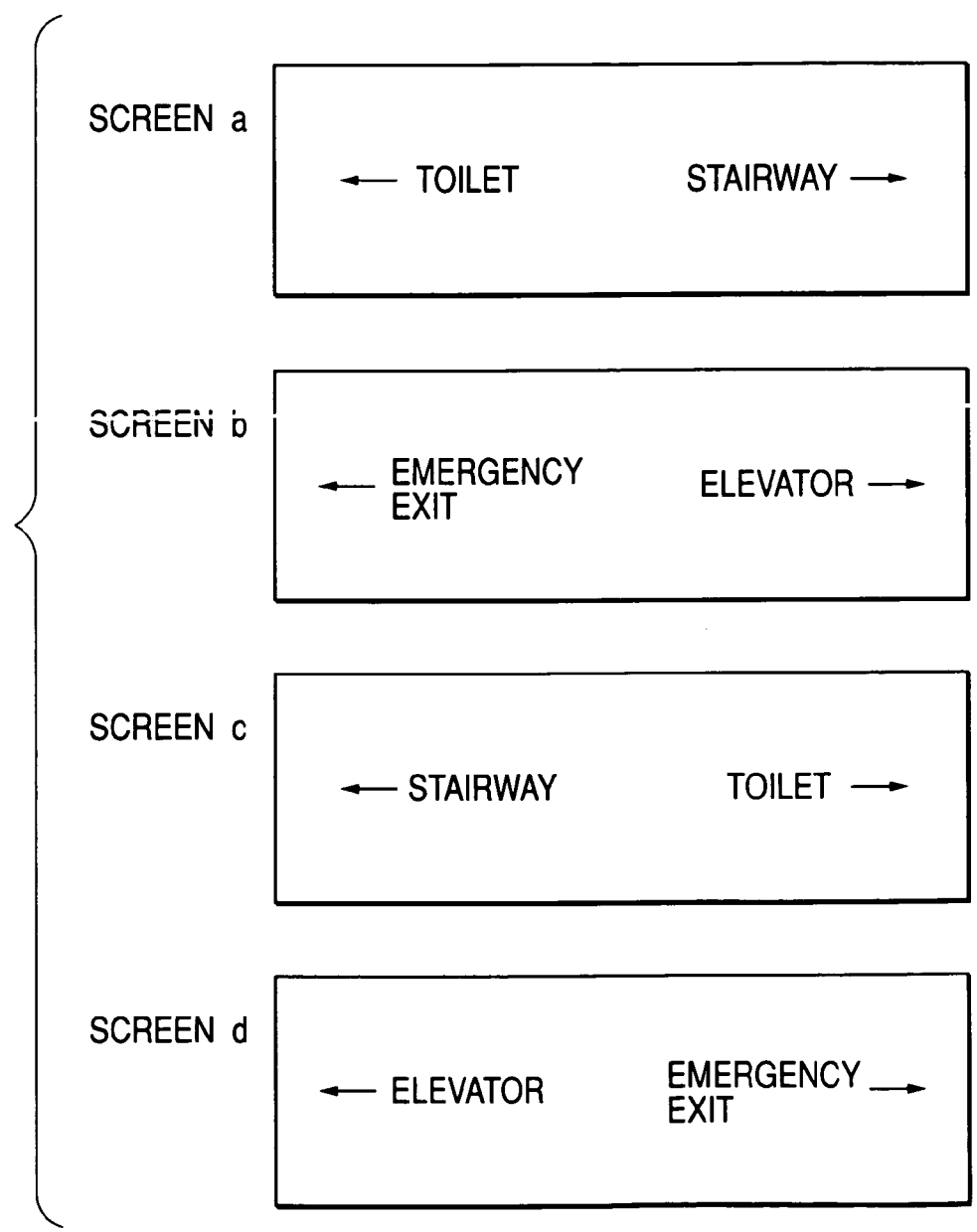
FIG. 4 illustrates the guidance contents output from the display unit.

FIG. 2 is a general block diagram of the display apparatus according to the first embodiment of the present invention. On the surface of the display unit 1 composed of a liquid crystal display or the like, a view angle-limiting filter (view angle-limiting optical component) is attached as described later. In addition, the display unit 1 is configured so as to be rotated continuously by the rotary drive shaft 3 of the rotary mechanism (rotary drive source) 2. A rotation angle sensor (detecting means) 4 detects the rotation angle of the display unit 1 (display direction of the display unit 1) by detecting, for example, the rotation angle of the rotary drive shaft 3. Besides, the display apparatus may also be provided with a detection unit (not shown in the figure) to sense a direction extending through a viewer (or the viewer) by using an infrared ray sensor or the like. A drive circuit 5 is a circuit to drive the rotary mechanism (rotary drive source) 2. A memory unit 7 stores text or image information which is to be displayed selectively depending on the display direction. FIG. 3 shows that the display apparatus of the first embodiment is set up where passages are intersected. Passages A, B, C and D respectively lead to an emergency exit, a stairway, an elevator and a toilet. In this case, the memory unit 7 stores text or image information a to d (as shown in FIG. 4) to be displayed respectively when the display unit 1 is faced to passages A to D.

A control unit 6 has a radio transmitter (not shown in the figure) whereas the display unit 1 has a radio receiver (not shown in the figure). Thus, according to the rotation angle of the display unit 1 (display direction of the display unit 1) detected by the rotation angle sensor 4, the control unit 6 can select and read out an appropriate text or image information content from the memory unit 7 and send it wirelessly to the display unit 1. This allows the displayed content to be switched depending on the display direction of the display unit 1. The control unit 6 may also be modified in such a manner that if a viewer is detected in some direction by the aforementioned detection unit, a text/image information content associated with the direction is selected and read out from the memory unit 6 so as to display it on the display unit 1 when the display direction of the display unit 1 is detected as equal to the direction of the viewer by the rotation angle sensor 4. For the control unit 6 to select and read out appropriate text/image information for display on the display unit 1 according to the rotary drive shaft 3, the rotary mechanism 2 must have a slip ring, blush or some other signal propagation means.

DC power can be supplied from the rotary unit 1 to the conductors of the drive shaft 3 via a slip ring, brush or the like and then to the display unit 1.

Figure 5:
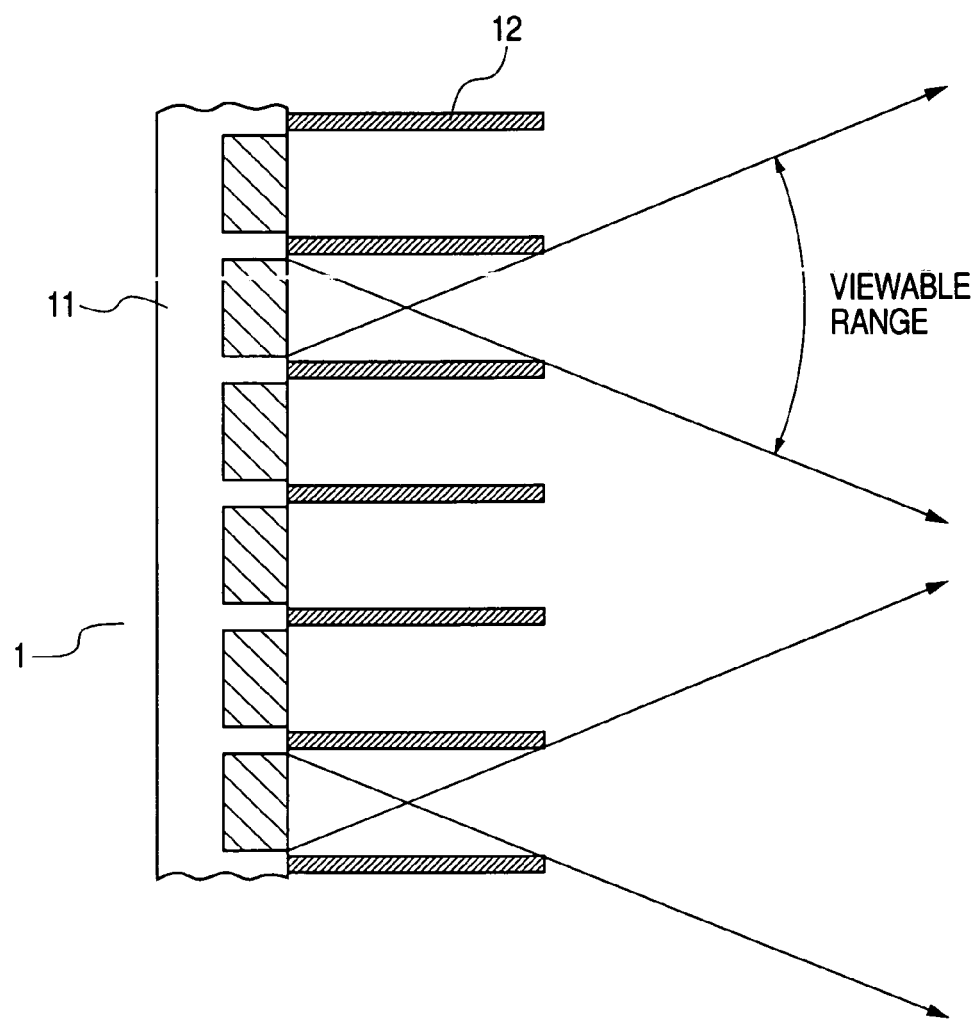
FIG. 5 shows a view angle-limiting filter attached to the surface of the display unit.
Figure 7A:
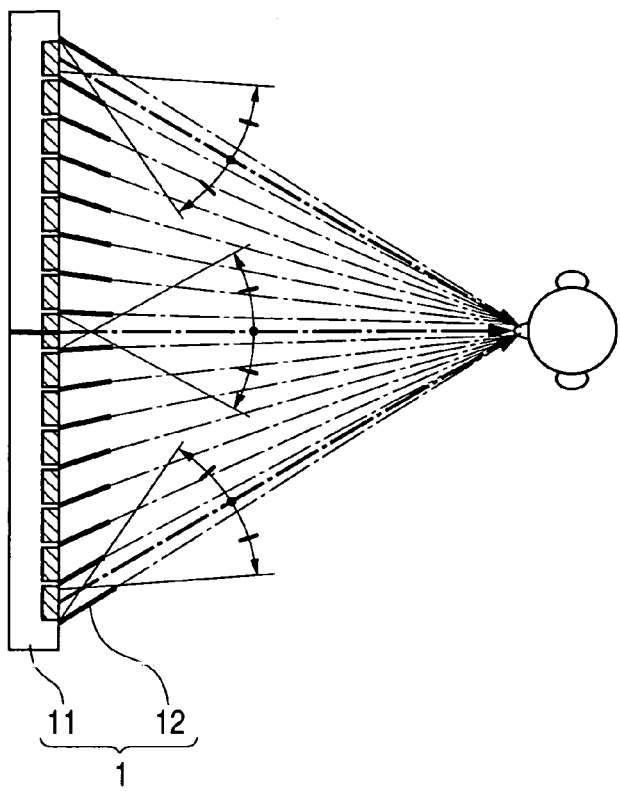
FIGS. 7(a) and 7(b) exaggeratedly show a view angle limiting-filter whose functional perpendicular direction is increasingly tilted as the periphery nears.
Figure 7B:
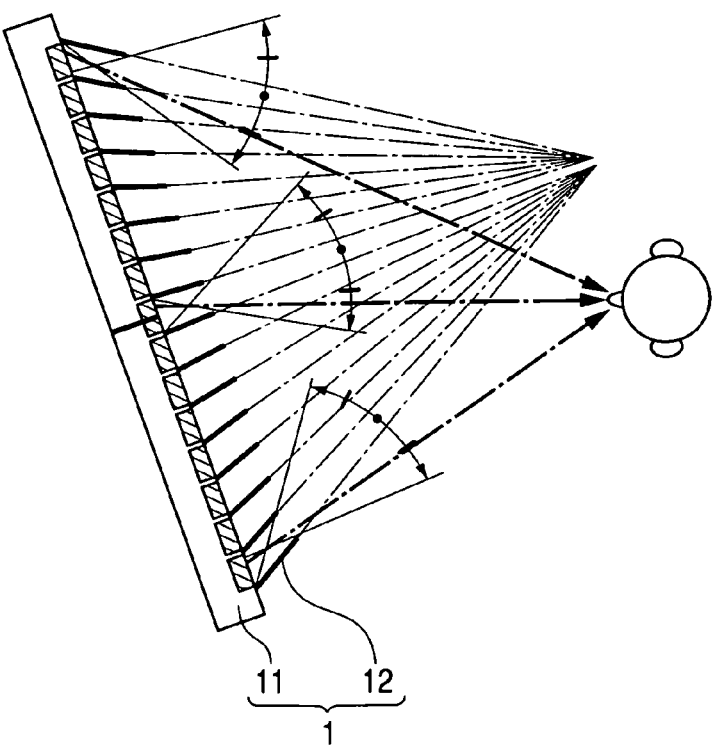

Assume that the display unit 1 displays a different content to each of four directions as shown in FIG. 3. The following describes how its maximum view angle is related with the interval (off interval). During each interval, a single color such as black is fully displayed. Alternatively, the backlight may be turned off if the display unit 1 is a liquid crystal display. To prevent two different contents from being viewed at the same time, a view angle-limiting filter (view angle-limiting optical component) 12 must be attached to the surface of a display 11 constituting the display unit 1 as shown in FIG. 5. The view angle-liming filter 12 is configured as an array of shielding fins 121 as shown in FIG. 6(*a*). Fins of 100 to 200 µm in thickness are arranged with a pitch of about 1 to 3 mm equal to the pixel size. The maximum view angle (viewable range) is dependent on the height of the fins. The height is about 1 to 3 mm for a maximum view angle of ±45 degrees and about 2 to 5 mm for maximum view visibility angle of about ±22.5 degrees. Alternatively, as shown in FIG. 6(*b*), 50 to 100 µm thickness shielding dividers 122, which have the same function as the fins 121, may be embedded with a pitch of about 1 to 3 mm equal to the pixel size in the transparent film or sheet 123 whose thickness is about 1 to 3 mm for a maximum view angle of about ±45 degrees and about 2 to 5 mm for a maximum view angle of about ±22.5 degrees. Also note that as shown exaggeratedly in FIGS. 7(*a*) and 7(*b*), the angle formed at a point on the screen of the display unit 1 between the line of sight and the display direction of the screen becomes larger as the point goes from the center to the periphery. To minimize the shielding due to these angles, fins of the view angle-limiting filter 12 must be slightly angled. In FIG. 7(*a*), the screen of the display 11 is being viewed by a person who exists right ahead of the display 11. In FIG. 7(*b*), the display 11 has been rotated a little and the screen is being viewed from a slightly oblique direction by the person. The same function of the view angle-limiting filter 12 may also be implemented by an array of cylindrical lenses each of which converges light so as to limit the view angle.

Figure 8A:
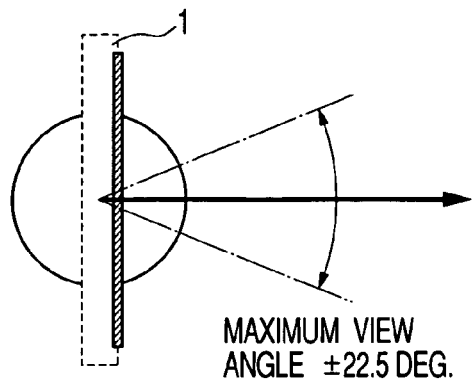
Figure 8B:
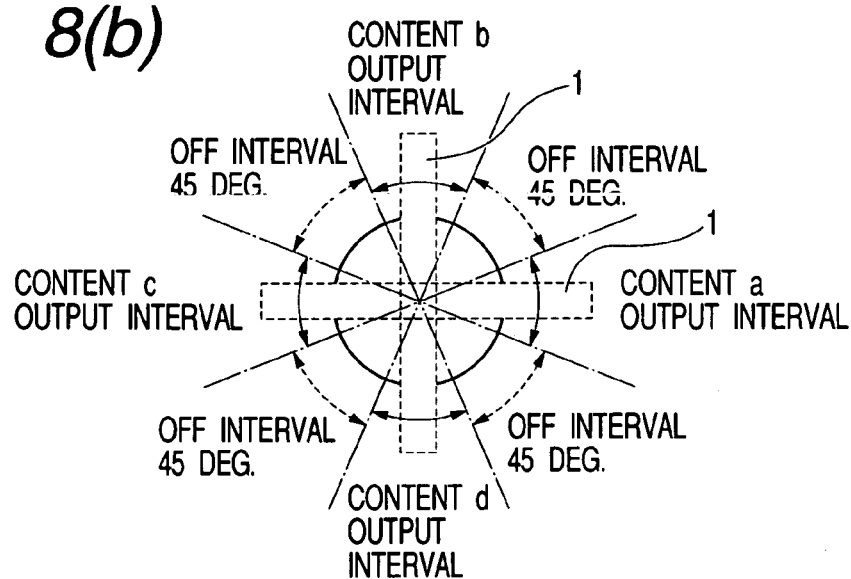
Figure 8C:
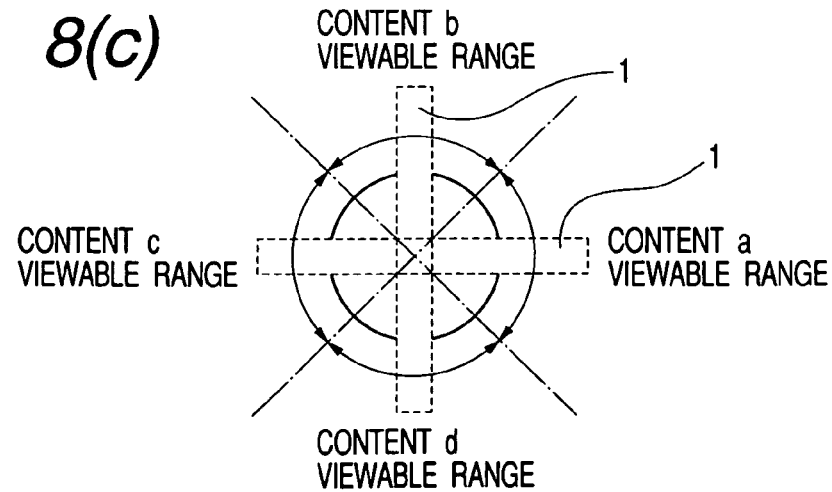
Figure 9A:
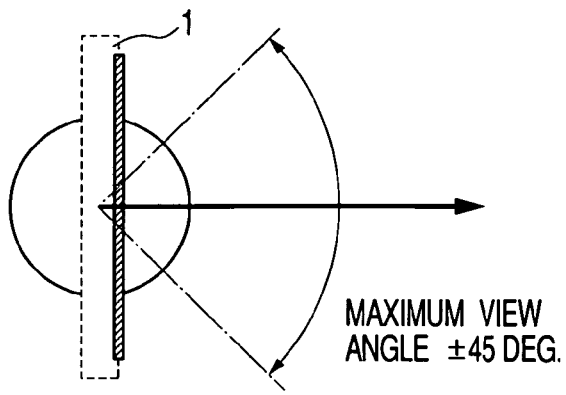
Figure 9B:
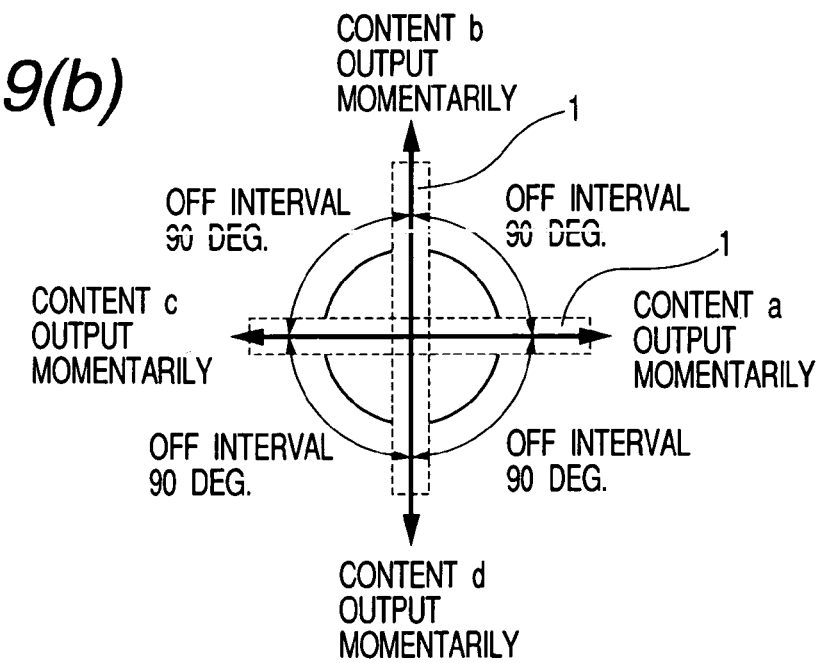
Figure 9C:
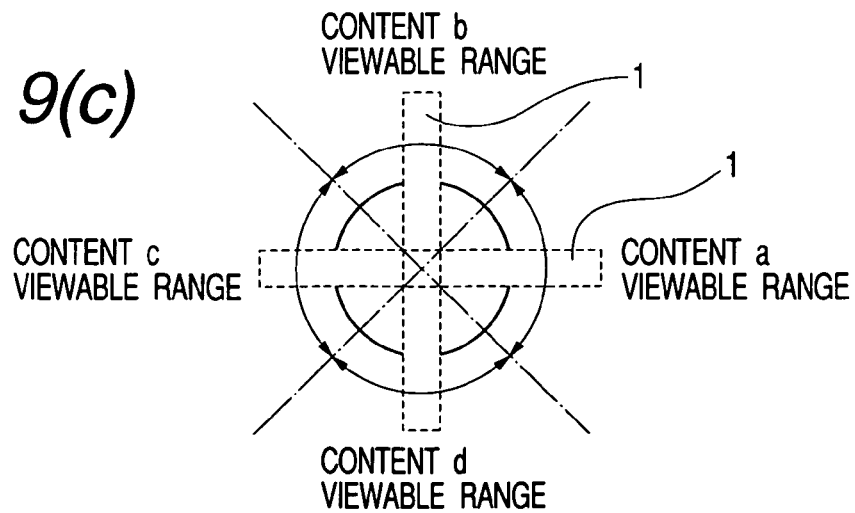

To prevent two different contents from being viewable concurrently when viewed from any direction, intervals (off intervals or no-content on intervals) substantially equal to the maximum view angle must be set as shown in FIGS. 8(*a*) to 8(*c*) and FIGS. 9(*a*) to 9(*c*). In each off interval, the display 11 must be either entirely filled with a single color such as black or remain turned off (the backlight must remain turned off in the case of a liquid crystal display). It is also necessary to make the sides and rear of the display 11 invisible by blackening them (in the case of one display having one screen). As a result, persons who view the display 11 from any direction are given only the text/image information to be delivered to that direction without noticing the probably strange movement of the display 11.

In the case of FIGS. 8(*a*), 8(*b*) and 8(*c*), the maximum view angle by the view angle-limiting filter 12 is ±22.5 degrees when the display unit 1 is viewed from four directions. To prevent two different contents from being viewable concurrently when viewed from any direction, the viewable ranges of contents a, b, c and d must be set as shown in FIG. 8(*c*) by imposing off intervals of 45 degrees each as shown in FIG. 8(*b*) if the view maximum angle is set to about ±22.5 degrees. This means that when the display unit 1 begins/ends a display interval, the view angle is about ±22.5 degrees. In this case, each of contents a, b, c and d is displayed during an interval of ±22.5 degrees.

In the case of FIGS. 9(*a*), 9(*b*) and 9(*c*) the maximum view angle by the view angle-limiting filter 12 is about ±45 degrees when the display unit 1 is viewed from four directions. To prevent two different contents from being viewable concurrently when viewed from any direction, the viewable ranges of contents a, b, c and d must be set as shown in FIG. 9(*c*) by imposing off intervals of about 90 degrees each as shown in FIG. 8(*b*) if the maximum view angle is set to ±45 degrees. This means that when the display unit 1 begins/ends a display interval, the view angle is about ±45 degrees. In this case, each of contents a, b, c and d is displayed for a moment.

As described so far, by imposing off intervals or no-content intervals according to the maximum view angle determined by the view angle-limiting filter 12 attached to the surface of the display 11, it is possible to prevent two different contents from being viewable concurrently when the display 11 is viewed from any direction. This makes it possible to display such guide information as shown in FIG. 4.

Figure 10:
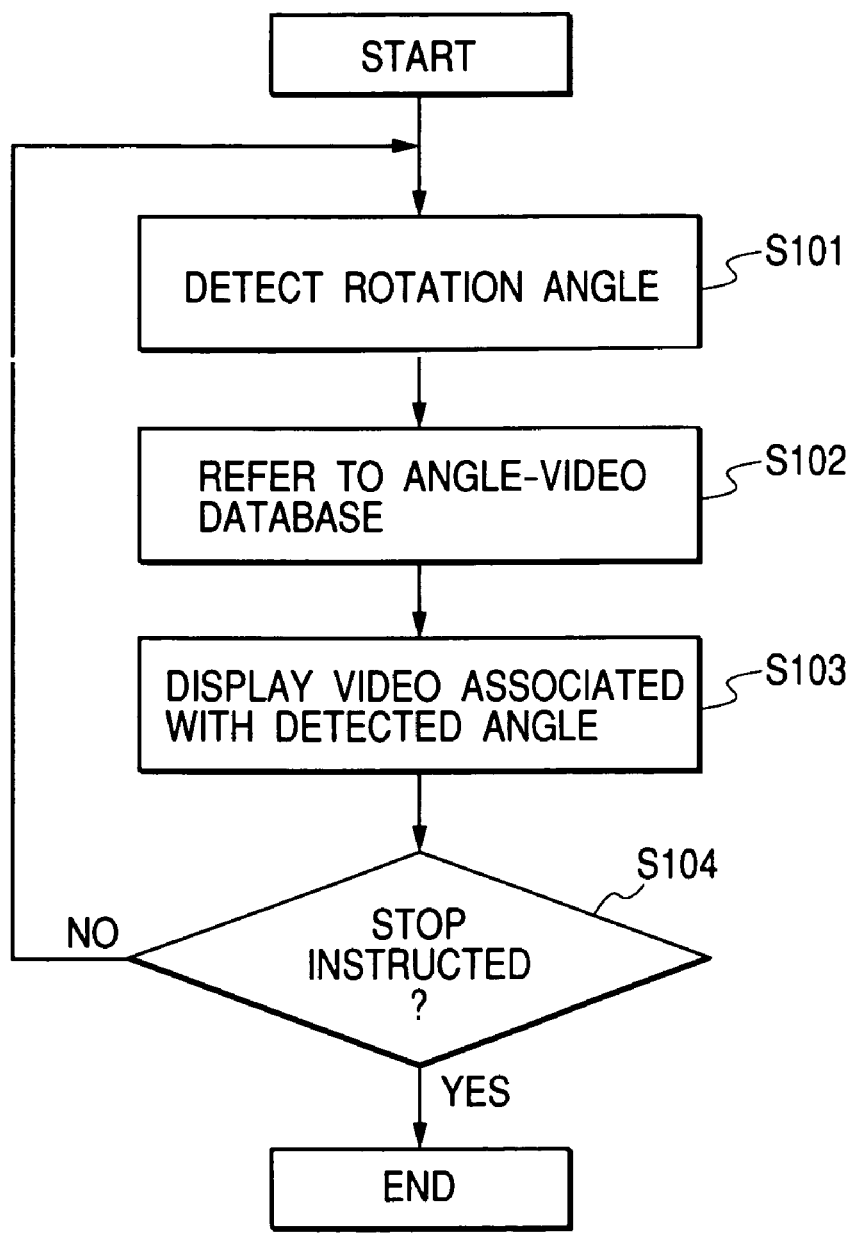
FIG. 10 is a flowchart showing a control flow for the display apparatus according to the first embodiment.
Figure 11:
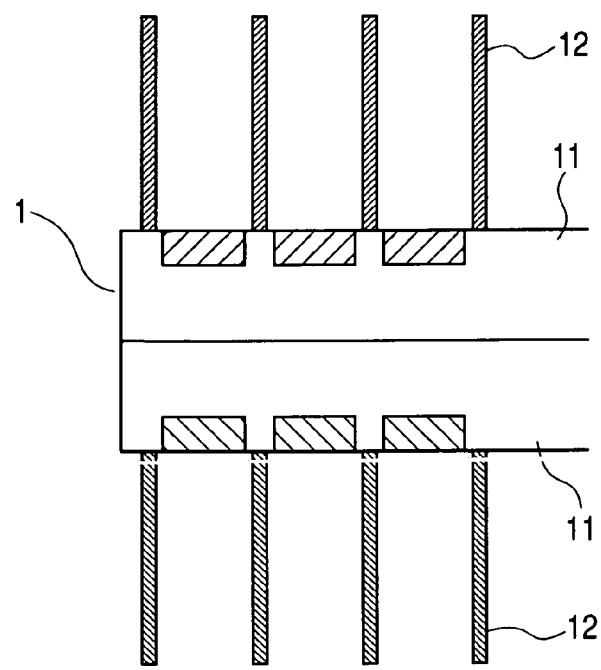
FIG. 11 shows a display unit constructed by bonding two view angle-limiting filter-attached displays back to back.

Then, the following describes how the first embodiment is controlled with reference to FIG. 10. Firstly, after the control is started, the rotation angle sensor 4 detects the rotation angle of the display unit 1 rotated by the rotary mechanism 2 (Step S101). The control unit 6 refers to a rotation angle-video database stored in the memory unit 7 (Step S102), reads out text/image information which is associated with the detected rotation angle of the display unit 1 and sends the information to the display unit 1. The display unit 1 is driven by an internal IC driver to display the information. During an off interval, however, the display unit 1 outputs fully a single color such as black or controls a backlight driver circuit to turn off the backlight (Step S103). This sequence is initiated repeatedly in Step S104 so that different text/image contents are displayed to the respective directions as shown in FIG. 4.

Specifically, assume that the display unit 1 is a single-screen display capable of displaying 60 frames per second and is controlled so as to deliver information to four directions and impose off or no-content intervals of 45 degrees each. In this case, if the off intervals is implemented by turning off the backlight, each content can be displayed 15 times per second since the content has only to be switched 4 times per revolution. In addition, if each off interval is considered one content, each content is displayed 7.5 times per second since the content is switched 8 times per revolution. The number of times each content is displayed per second to the corresponding direction can further be increased by raising the rotation speed combined with a high-speed response display. It is also possible to display moving images as well as still text/image information. Also note that although equally distant four directions are assumed in the description of the first embodiment, it is also possible to display information to unequally distant four directions or display different pieces of information to five or more directions.

By the way, if the rotary drive shaft 3 is aligned to the center of the screen of the display unit 1, points of the screen near the center line look stationary. However, as the points go toward the periphery, they look to be more moving while the display unit 1 is rotating. To provide a stationary text/image content to persons right ahead of the display unit 1, a plurality of text/image contents designed to produce the stationary text/image content during the display interval must be prepared and stored in the memory unit 7. Making the displayed content look stationary can also be achieved by minimizing the on time of the display unit if it provides sufficient brightness.

Second Embodiment

With reference to FIGS. 12 to 23, the following describes a display apparatus according to a second embodiment of the present invention capable of providing a three dimensional image to a viewer who moves around the display apparatus.

Figure 12:
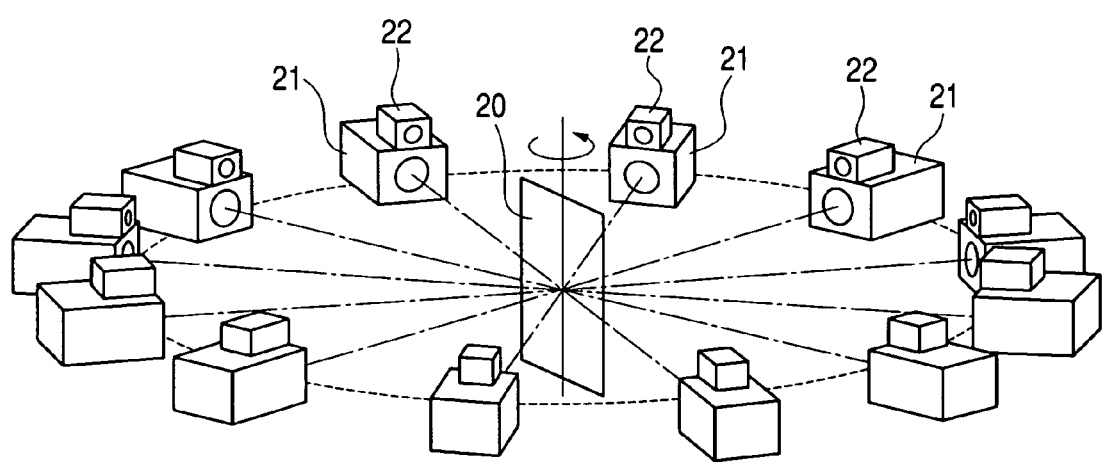
FIG. 12 shows the principle of a display apparatus according to a second embodiment of the present invention.
Figure 14:
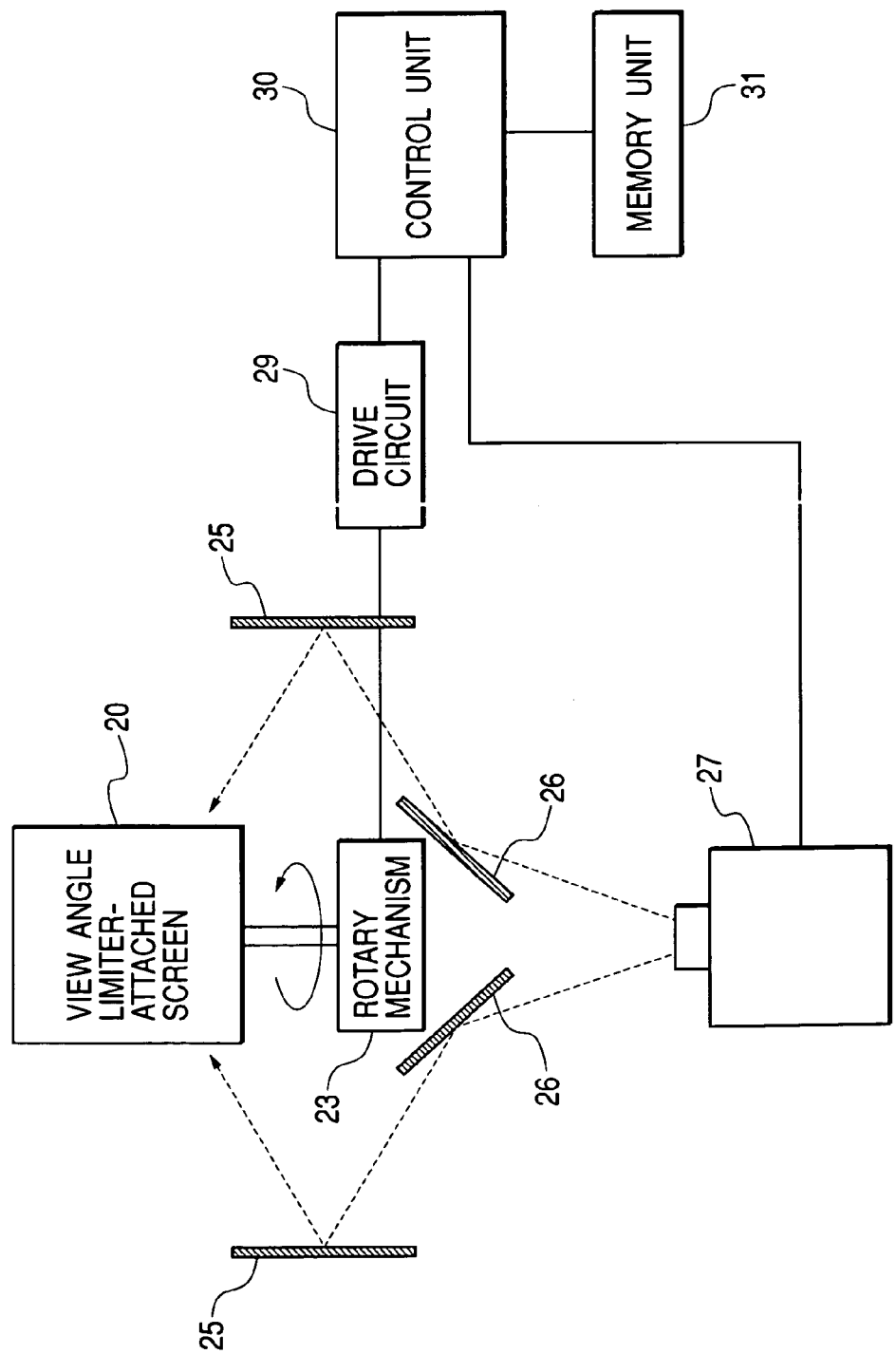
FIG. 14 is a general block diagram of the display apparatus according to the second embodiment.

FIG. 12 shows the principle of the display apparatus implemented as the second embodiment. A view angle-limiting filter-attached screen (display unit) 20 is rotated continuously or stepwise. Around it, a plurality of image pick up devices (CCD cameras) 22 each combined with an electronic projector 21, such as a liquid crystal-used one, are placed. The number of image pickup devices 22 is equal to the number of image divisions to constitute a three dimensional image of an object. Each electronic projector 21 reads out an image division (for example, one of images Ga to Gp in FIG. 17) corresponding to its angular position from such a memory unit 31 as shown in FIG. 14 and projects the frame to the screen 20. Viewers at any positions around the view angle-limiting filter-attached screen 20 feel as if the object actually was present there.

Figure 31:
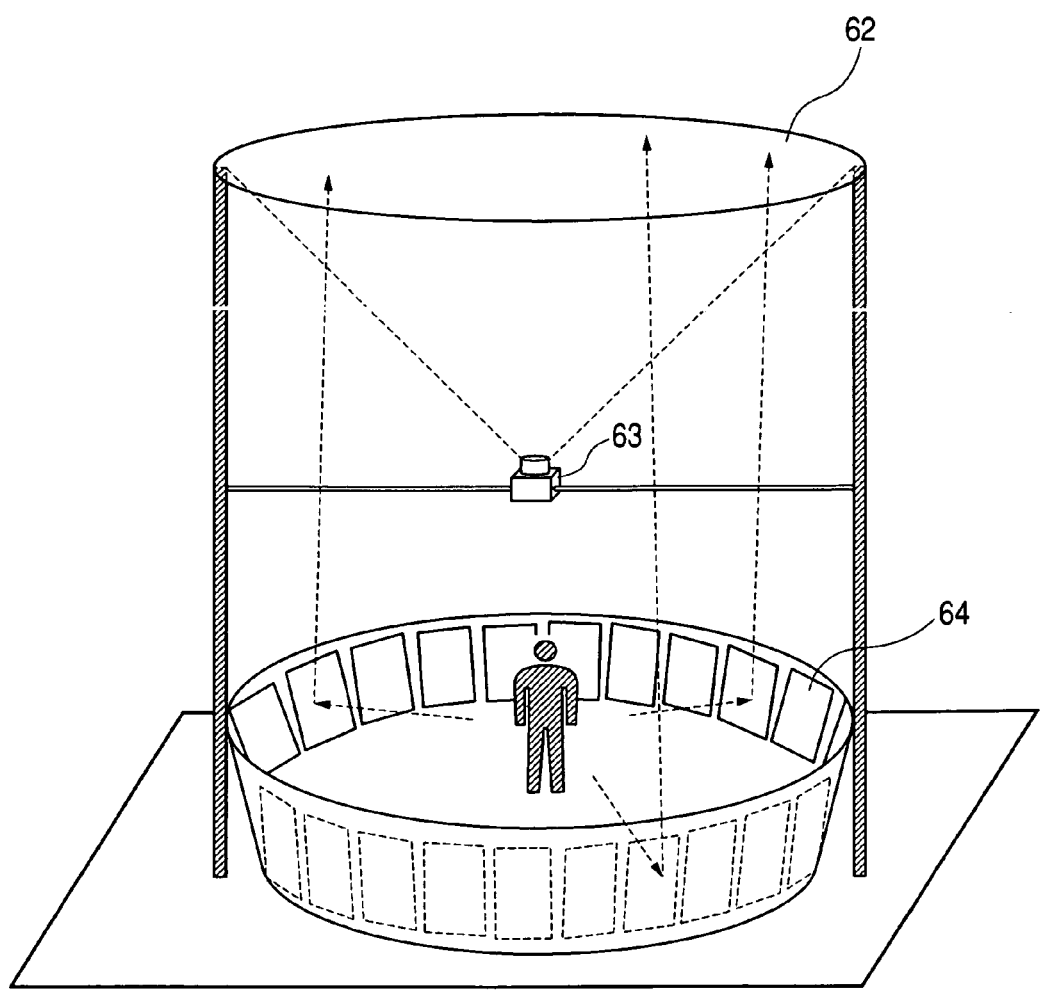
FIG. 31 is an oblique perspective view of another image pickup apparatus according to the fifth embodiment of the present invention.

Image divisions to be projected can be picked up by pick up devices (CCD cameras) 22. In this case, a three-dimensional object 35 is placed at the position of the screen 20 and shot with the plural image pickup devices 22. The obtained image divisions are stored in such a memory unit 31 as shown in FIG. 31. The image divisions can be stored as still images if the object is not moving. It is also possible to store them as moving images if the object is moving.

In the above description of the principle of the second embodiment, a plurality of electronic projectors 21 are set up around the screen 20. As compared with another example described later, this configuration provides higher image quality although it is a more complicated and larger-scale implementation. In addition, since each electronic projector 21 has a light source, illumination can be raised sufficiently. It is therefore possible for each electronic projector 21 to display a more definite image if the projector is turned on momentarily only when the screen is right ahead of it (remained turned off or displays fully a single color such as black while the screen is not faced to it). In this case, however, means (a detection unit such as a sensor) to detect the angle of the screen is required (not shown in the figure).

Figure 13:
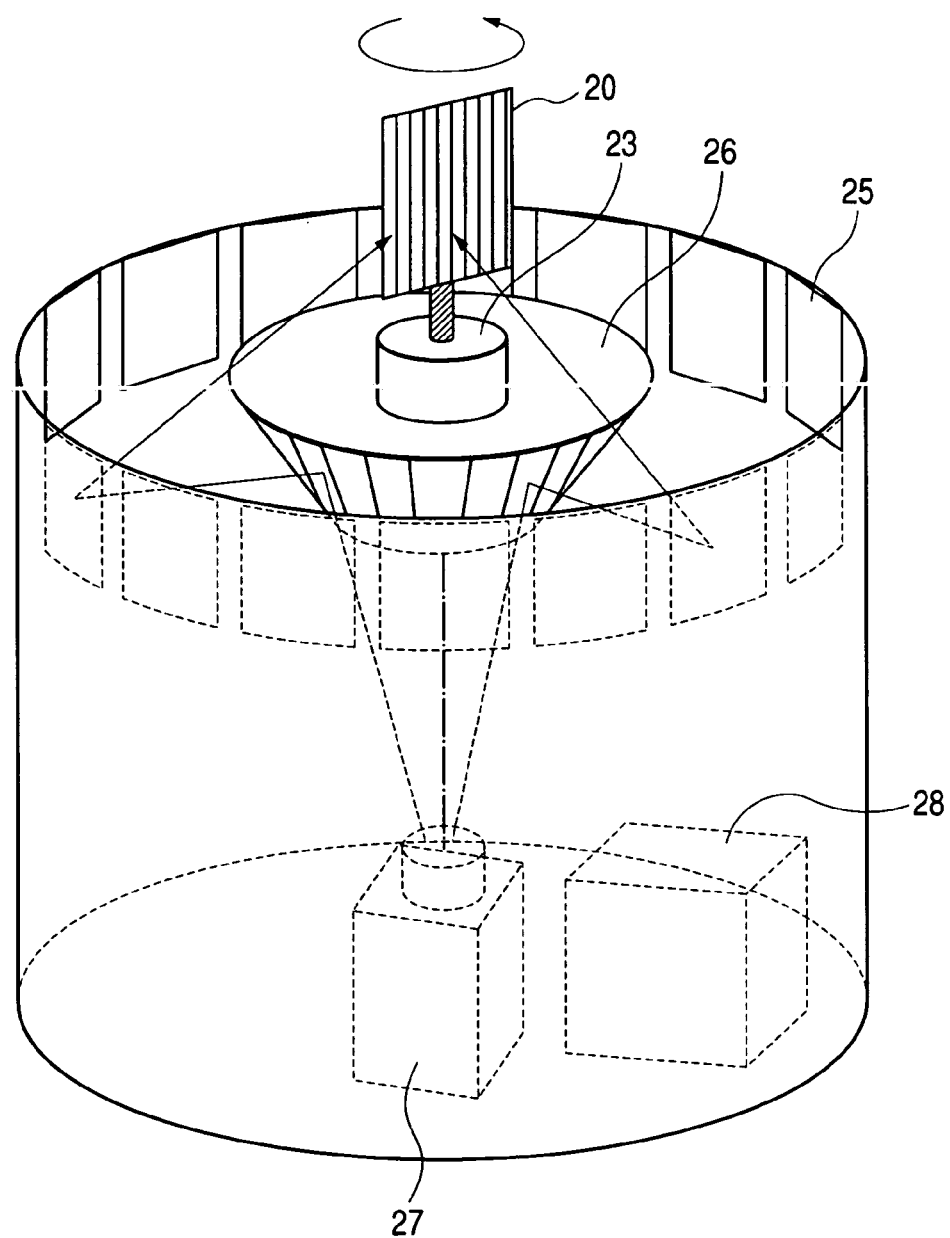
FIG. 13 is a perspective view of the display apparatus according to the second embodiment.
Figure 15:
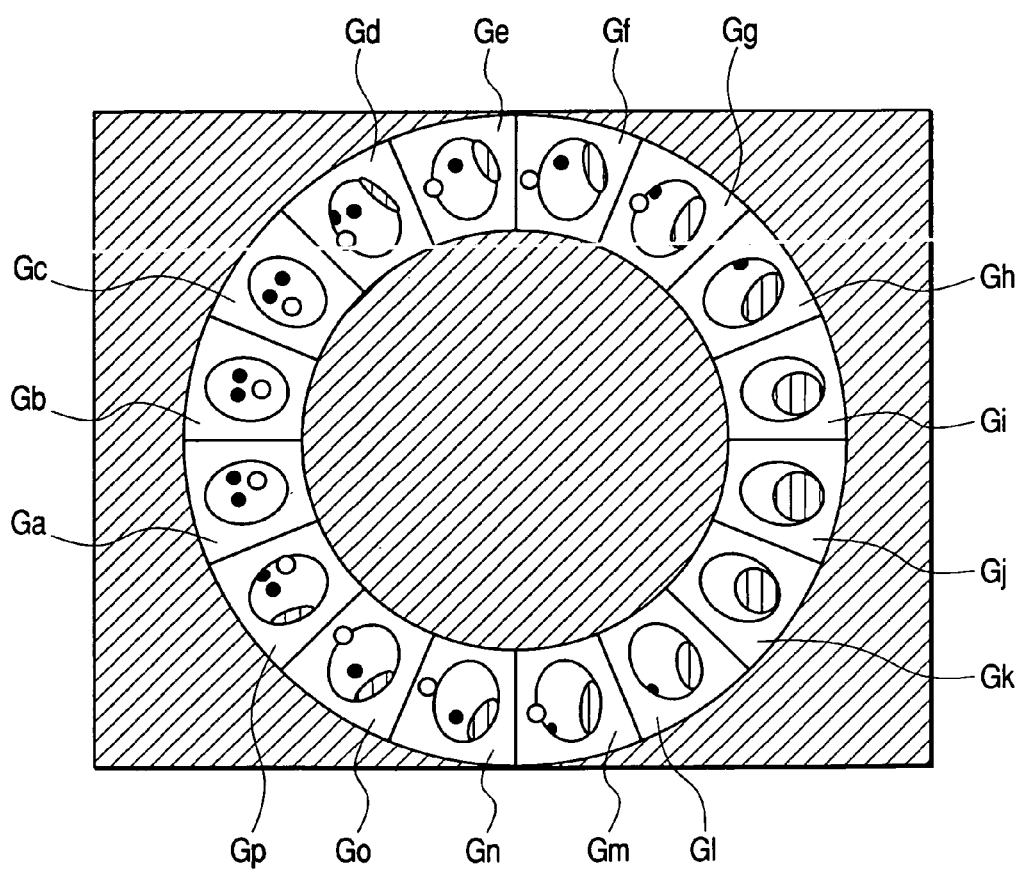
FIG. 15 is a diagram showing 16 image divisions projected to a rotating screen from an electronic projector.

As such, the following describes another example of the second embodiment with reference to FIGS. 13 to 22. FIG. 13 shows a perspective view of the display apparatus of this second embodiment. A view angle-limiting filter-attached screen 20 is rotated continuously or stepwise by a rotary mechanism (rotary drive source) 23. Reference numeral 25 denotes a cylindrical internally polyhedral mirror (mirror group). 26 is a conical externally polyhedral mirror (mirror group). These mirrors 25 and 26 form a projection optical system. Reference numeral 27 is an electronic projector such as a liquid crystal projector. According to the input image data, it projects such image divisions Ga to Gp (which constitute a three-dimensional image of an object when viewed around the object and are arranged circularly in a ring area) as shown in FIG. 15. Reference numeral 28 is a general control section comprising a drive circuit 29, a control unit 30 and a memory unit 31. The control unit 30 controls the drive circuit 29 to drive the rotary mechanism 23 and the electronic projector 27. The memory unit 31 stores image divisions of a three-dimensional image Ga to Gp to be projected by the electronic projector 27. The series data Ga to Gp to be stored in the memory unit 31 may be either created by computer graphics or the like or shot by a CCD camera or the like as described later. When a CCD camera is picked up an object, it is also possible to receive the three-dimensional image from the remote place and to store it in the memory unit 31.

Figure 16:
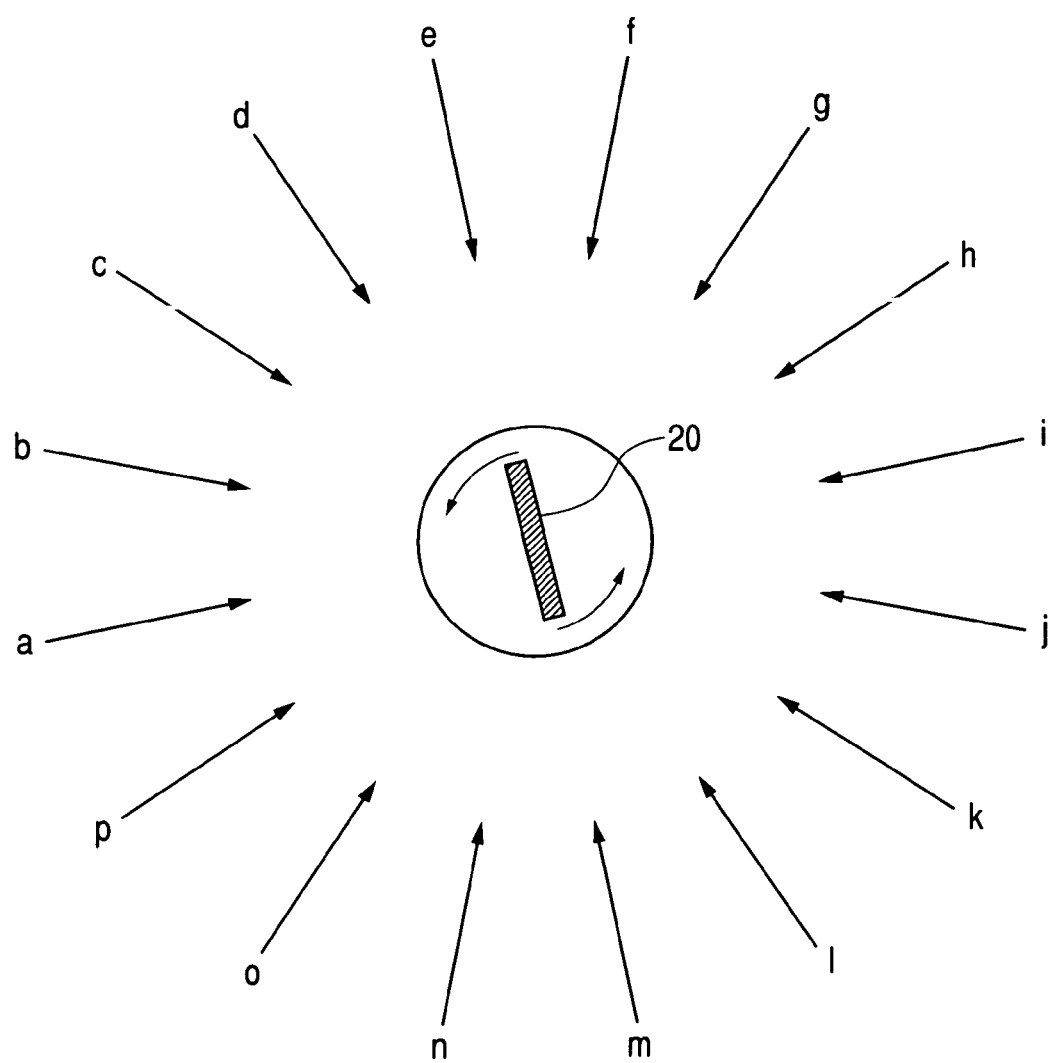
FIG. 16 is a diagram showing 16 directions a to p from which projection is made to the rotating screen.
Figure 20:
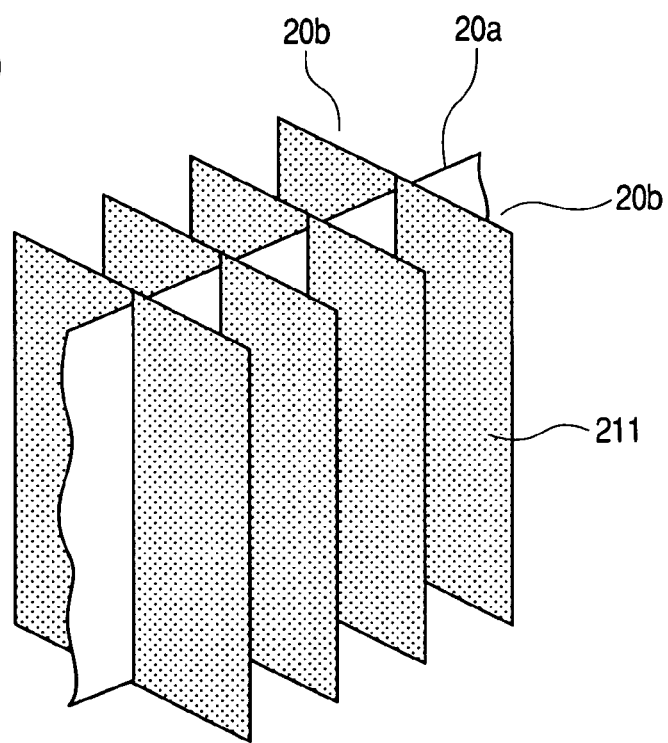
FIG. 20 is a perspective view showing an example of a view angle-limiting filter-attached screen.

In this configuration, the control unit 30 reads out image data, such as those shown in FIG. 15, from the memory unit 31 and sends them to the electronic projector 27. The electronic projector 27 displays the received image data on a liquid crystal panel or the like. The displayed image data is projected onto the screen 20. In more detail, the image divisions Ga to Gp arranged in a ring area are sequentially are projected to the corresponding faces of the conical externally polyhedral mirror 26 and, reflected there, projected to the corresponding faces of the cylindrical internally polyhedral mirror 25 which in turn reflects/projects the image divisions Ga to Gp of FIG. 17 from respective directions to the screen 20 as shown in FIG. 16. Each side of the rotating screen 20 comprises a screen plate 20a having each side provided with a view angle-limiting filter (optical component) 20b (as shown in FIG. 20). This filter limits the maximum view angle (viewable range) to, e.g., ±5.6 degrees (360 degrees/(16×4) for 16 image divisions) from its normal direction. Therefore, only one image division is viewable from each direction a to p as shown in FIG. 16 since the projected adjacent image divisions are shielded. As a result, a person moving around across the directions a to p can view a three-dimensional image of an object, composed of image divisions Ga to Gp shown in FIG. 17. This method is advantageous in that plural persons lying at respective locations can simultaneously enjoy the image. On the other hand, it is disadvantageous in that each image division is not displayed during 97% (31/32) of the display time when 16 image divisions are displayed per revolution.

To cope with this disadvantage, the control unit 30 controls the drive circuit 29 to drive the rotary mechanism 23 so as to face the screen toward a viewer. The direction of the viewer, one of directions a to p, is detected by using a detection unit such as an infrared ray sensor (not shown in the figure) or receiving a radio directional signal from the viewer (via a remote switch or the like). For the control unit 30 to control the rotary drive so as to face the screen 20 toward a viewer, it is necessary to detect the rotation angle of the screen 20 by a rotation angle-detecting sensor (not shown in the figure). If the viewer moves around, the control unit 30 controls the rotation so as to keep the screen 20 faced toward the viewer. This allows the viewer to always view some image division projected to the screen 20 facing the viewer. In addition, if only an image division which was shot from the current direction of the viewer is projected to the screen 20 from the electronic projector 27, it is possible to eliminate the view angle-limiting filter 20b. If there are plural viewers, it is preferable to rotate the screen in steps so as to maximize the respective periods during which the screen is faced to the viewers. To prevent each image division from looking blurred, it may be preferable to momentarily display each image division only when the screen is just faced to its shot direction. In this case, the lamp in the projector is implemented by a stroboscopic lamp or a shutter is used to shield the projection light except when the screen is just faced to each shot direction. In either method, the sensor (not shown in the figure) to detect the rotation angle of the screen is used to detect the moments when the screen is just faced to the respective directions from which the image divisions were shot.

Figure 19:
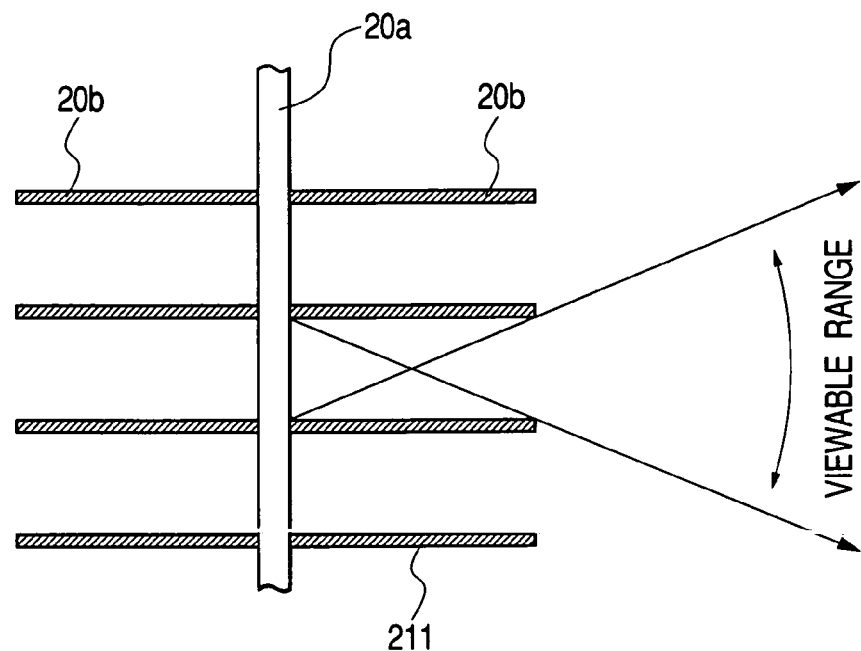
FIG. 19 is a diagram for explaining a view angle-limiting filter-attached screen.

The view angle-liming filter 20b is configured as an array of shielding fins 211 as shown in FIGS. 19 and 20. Fins of about 100 to 200 μm in thickness are arranged with a pitch of about 0.5 to 2 mm. The maximum view angle (viewable range) is dependent on the height of the fins. The height is about 5 to 20 mm for a maximum view angle of ±5.6 degrees (in the case of 16 image divisions) and about 3.2 to 13 mm for maximum view visibility angle about ±9.0 degrees (in the case of 10 image divisions). Alternatively, about 50 to 200 μm thickness shielding dividers (not shown in the figure), which have the same function as the above-mentioned fins, may be embedded with a pitch of about 0.3 to 2 mm in the transparent film or sheet (not shown in the figure) whose thickness is set to about 3 to 20 mm for a maximum view angle of about ±5.6 degrees (in the case of 16 image divisions) and about 1.9 to 13 mm for a maximum view angle ±9.0 degrees (in the case of 10 image divisions). The same function of the view angle-limiting filter 20b may also be implemented by an array of cylindrical lenses each of which converges light so as to limit the view angle.

Figure 17:
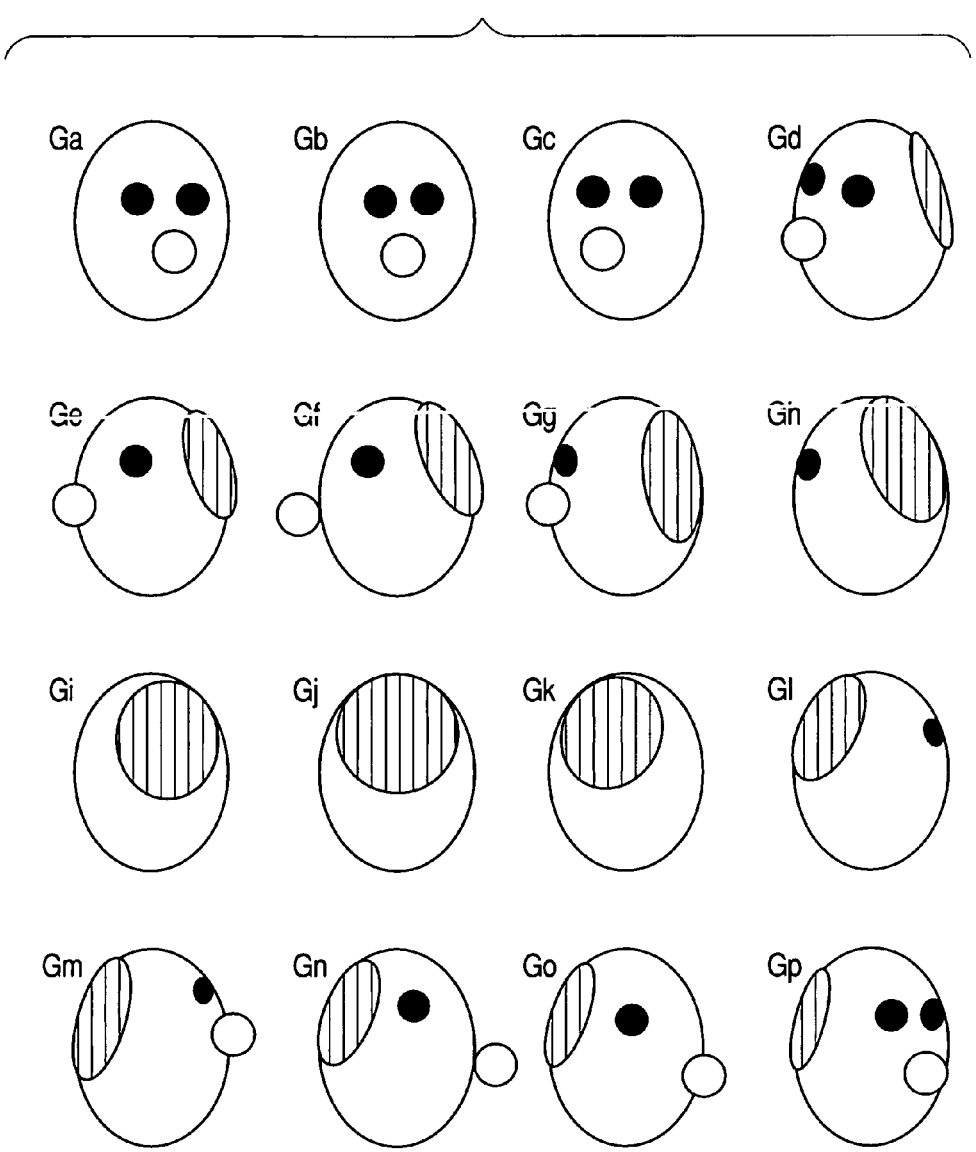
FIG. 17 is a diagram showing 16 image divisions Ga~Gp which constitutes a three-dimensional image viewed by a person who moves around the screen.
Figure 18:
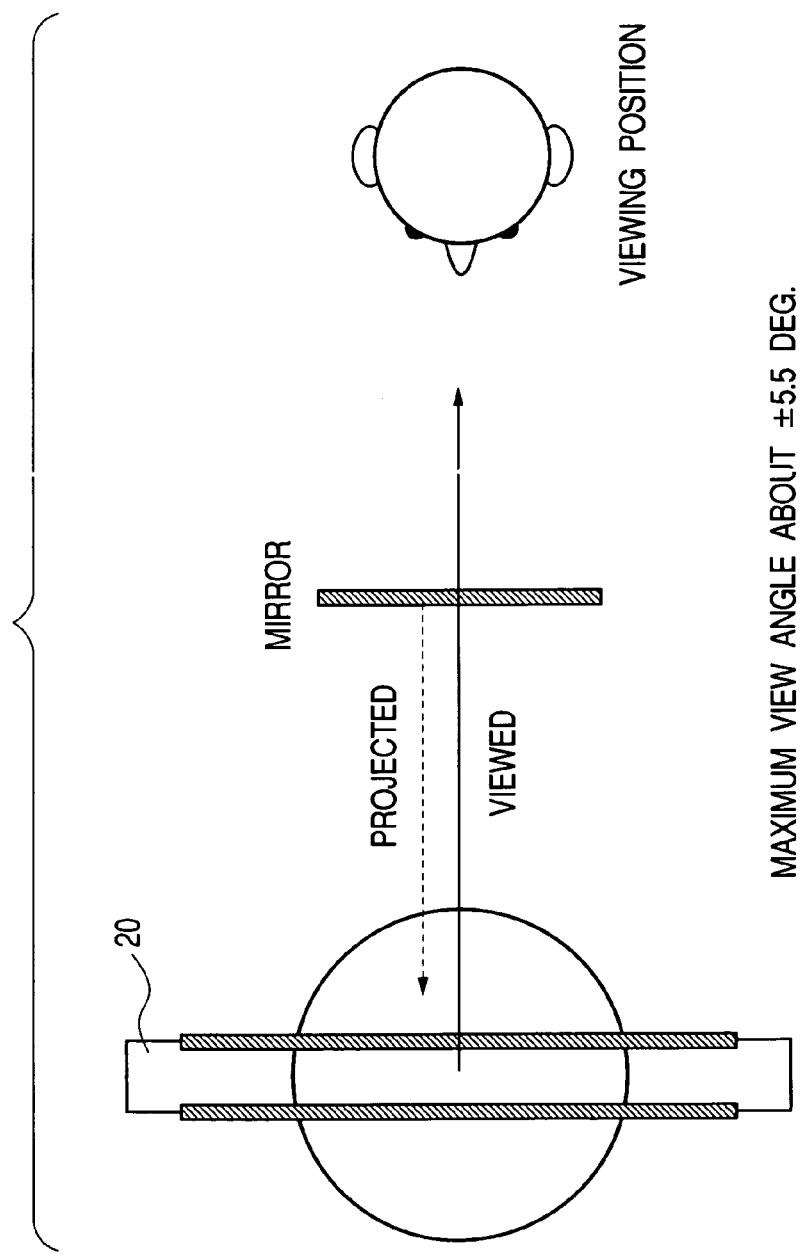
FIG. 18 is a diagram for explaining the maximum view angle.
Figure 21:
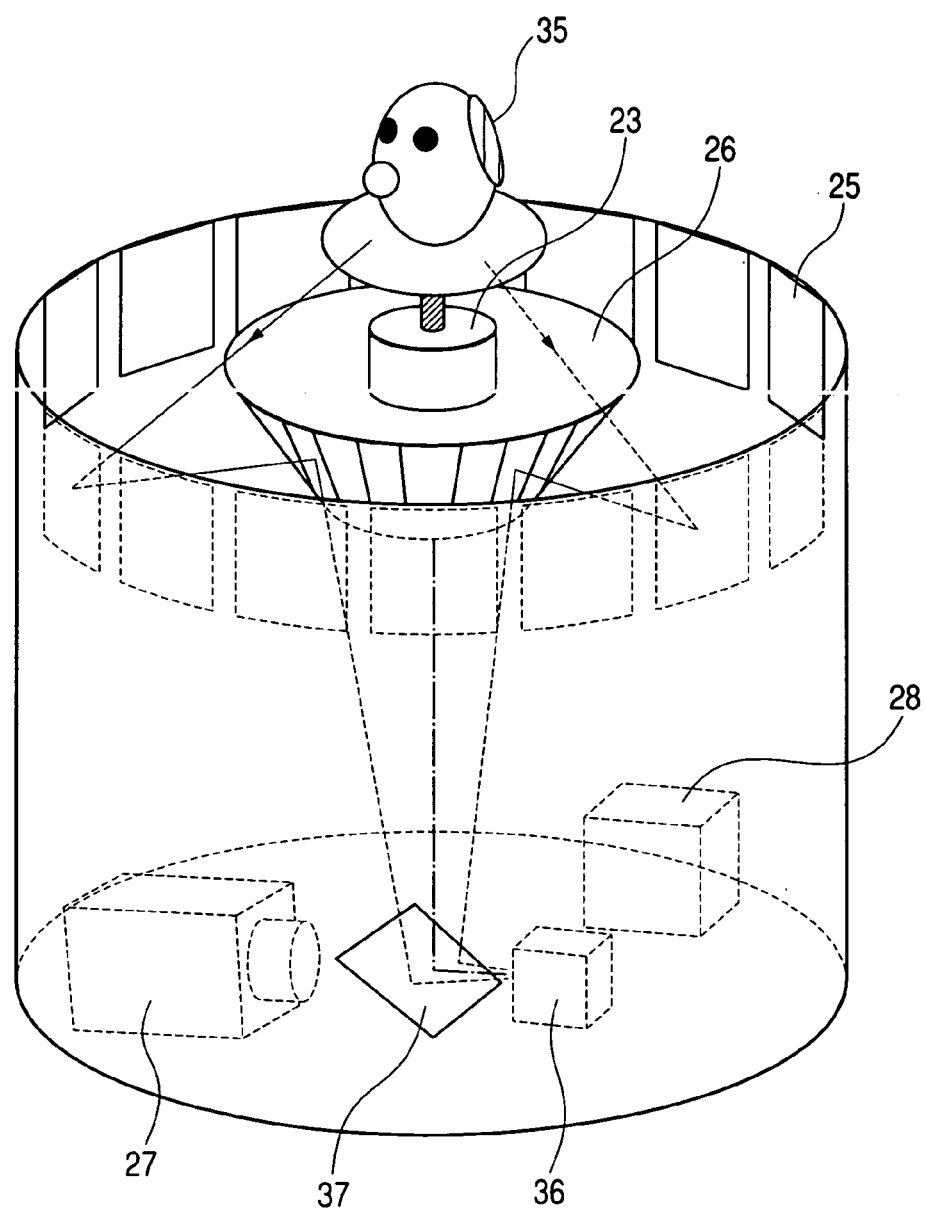
FIG. 21 is a perspective view of an acquiring unit for acquiring (obtaining) image divisions included in the display apparatus according to the second embodiment.
Figure 22:
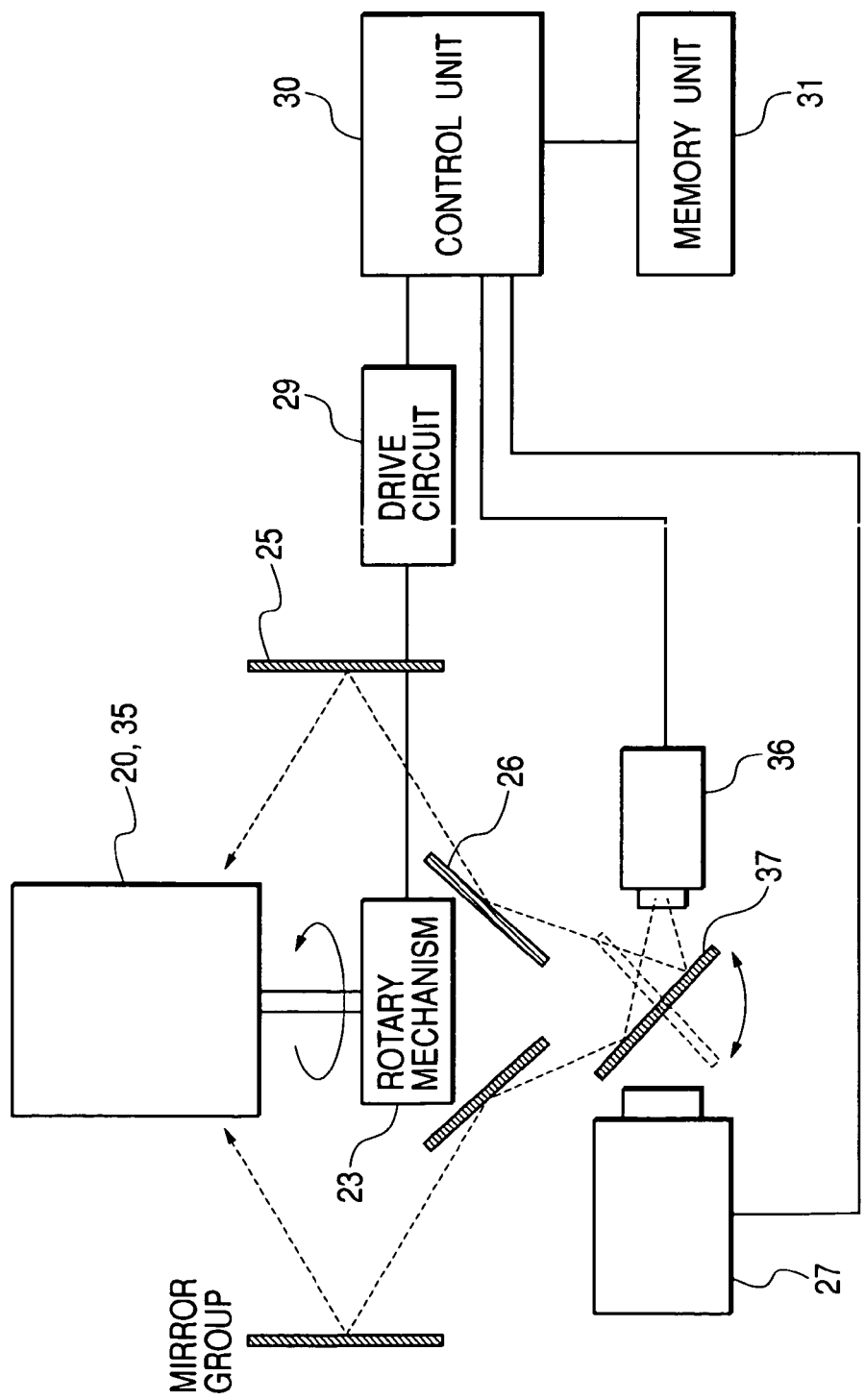
FIG. 22 is a general block diagram of the acquiring unit for acquiring image divisions included in the display apparatus according to the second embodiment.

With reference to FIG. 21, the following describes how to prepare the image divisions Ga to Gp shown in FIG. 15. That is, the acquiring unit (apparatus) to acquire the image divisions Ga to Gp is configured by adding a switching mirror 37 and an image pickup device (CCD camera) 36 to the apparatus shown in FIG. 13. Firstly, the view angle-limiting filter-attached screen 20 is removed from the rotary mechanism 23 and an object 35 is placed where the view angle-limiting filter-attached screen 20 was mounted. Then, the image divisions of the stationary object 35, viewed from the respective directions a to p as shown in FIG. 16, are reflected by the faces of the cylindrical internally polyhedral mirror 25, the faces of the conical externally polyhedral mirror 26 and the switching mirror 37 to the CCD camera 36. The image divisions Ga to Gp picked up by the CCD camera 36 as shown in FIG. 17 are stored in the memory unit 31. That is, the image divisions are obtained from the respective corresponding faces of the cylindrical internally polyhedral mirror 25 or those of the conical externally polyhedral mirror 26. To display a moving object, they are stored as moving images.

If illumination is required by the CCD camera 36 to pick up the image divisions Ga to Gp of the object 35 viewed from directions a to p, for example, a half mirror (not shown in the figure) is set up between the switching mirror 37 and the CCD camera 36 so that the half mirror, illuminated by the light source, illuminates the object 35 sequentially from the directions a to p.

Needless to say, when the image divisions Ga to Gp are projected and displayed on the rotating screen 20, the screen 20 is mounted on the rotary mechanism 26 after the object 35 is removed, and the switching mirror 37 is switched before the apparatus is started.

As described so far, the image divisions Ga to Gp can be picked up by the CCD camera 36 that has substantially the same view angle as the electronic projector 27. Thus, since the image divisions picked up can directly be used by the electronic projector 27, the system can be implemented as a compact and inexpensive one. It is also possible to exchange three-dimensional images between two systems. One system is set up to use the camera to pick up images and send them to the other system that is set up to use the electronic projector.

Third Embodiment

With reference to FIG. 23, the following describes a stereoscopic display apparatus according to a third embodiment.

Assume that the display of the first embodiment or the screen of the second embodiment is viewed from an arbitrary position by two eyes as shown in FIG. 23(a). If the apparatus is configured so that the two eyes respectively view the different adjacent image divisions due to the limited view angle, stereoscopic viewing can be realized without wearing glasses, etc. as shown in FIG. 23(b). Since the left and right eyes are 6 to 7 cm distant from each other, if the viewer is about 30 cm distant from the center of the screen, the viewing angle of each eye is about 6 to 7 degrees. In this case, such a display apparatus can be implemented by setting the number of image divisions to about 25 to 30 and the maximum view angle determined by the view angle-limiting filter to about 3 to 3.5 degrees.

According to the third embodiment described above, it is possible to realize stereoscopic viewing if the angular resolution is high enough to allow the left and right eyes to view different image divisions without wearing glasses, etc. This stereoscopic effect can be enjoyed from any direction between 0 and 360 degrees. In addition, this effect can be enjoyed by plural viewers regardless of whether the image source from the memory unit 7 or 31 is still images or moving images.

In addition, the stereoscopic effect can directly be obtained from the image divisions of an object which are picked up by a camera under the above-mentioned condition in the same system as the second embodiment. The three-dimensional image of the object can easily be reproduced with the stereoscopic effect in the same system.

Fourth Embodiment

With reference to FIGS. 15 to 20 and FIGS. 24 to 28, the following describes a display apparatus according to a fourth embodiment of the present invention capable of providing a three-dimensional image to a viewer who moves around the display apparatus.

Figure 24:
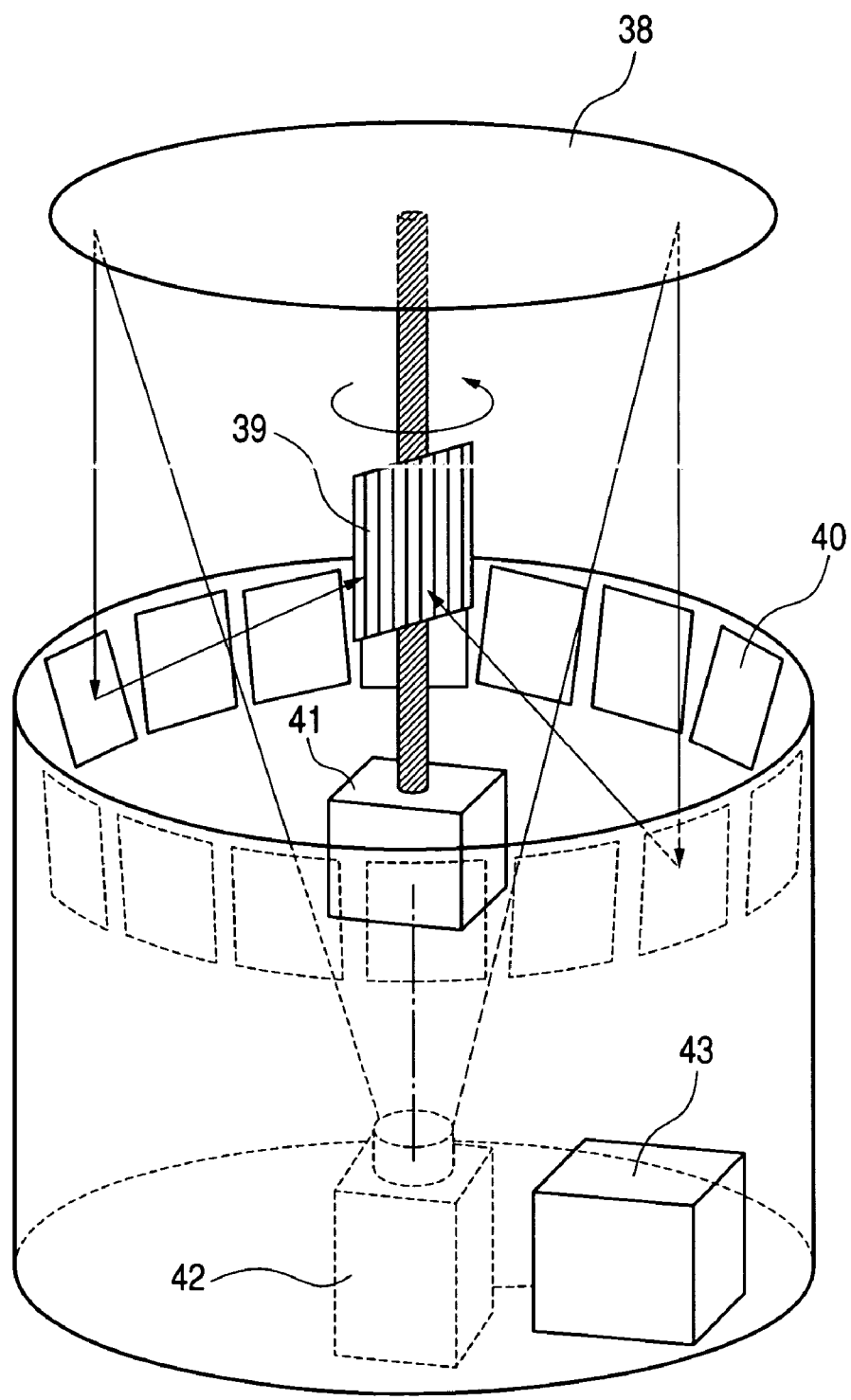
FIG. 24 is a perspective view of a display apparatus according to a fourth embodiment of the present invention.

FIG. 24 is a perspective view of the display apparatus of the fourth embodiment. A view angle-limiting filter-attached screen 39 is rotated continuously or stepwise by a rotary mechanism (rotary drive source) 41. Reference numeral 40 denotes a cylindrical internally polyhedral mirror (mirror group). Reference numeral 38 is a mirror attached to the inner side of the ceiling of the display apparatus. These mirrors 38 and 40 form a projection optical system. Reference numeral 42 is an electronic projector such as a liquid crystal projector. According to the input image data, it projects such image divisions Ga to Gp (which constitute a three-dimensional image of an object when viewed around the object and are arranged circularly in a ring area) as shown in FIG. 15.

Figure 25:
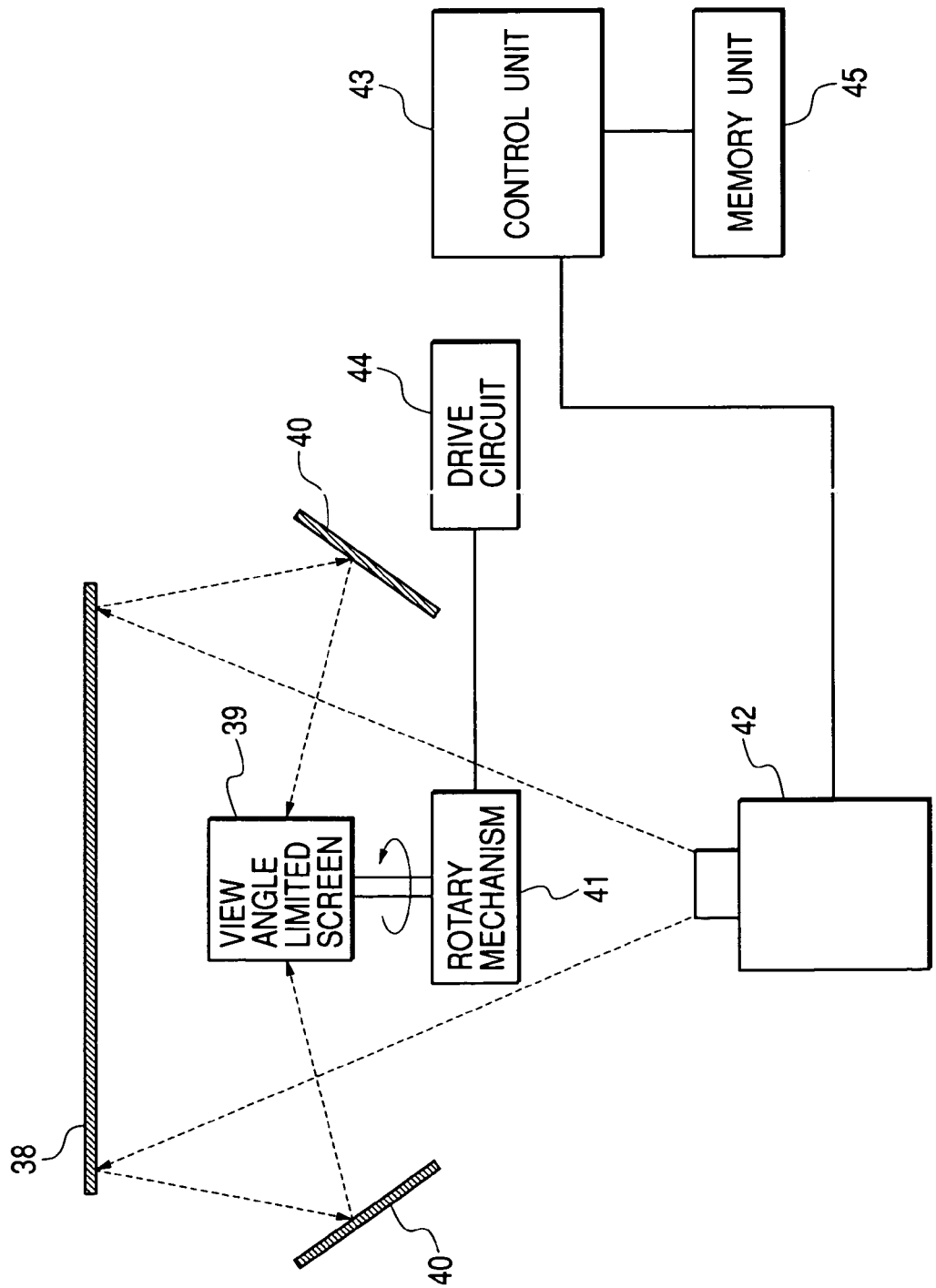
FIG. 25 is a general block diagram of the display apparatus of the fourth embodiment.

FIG. 25 is a total block diagram of the display apparatus of the fourth embodiment. The display apparatus comprises a drive circuit 44, a control unit 43 to control the drive circuit 44 to drive a rotary mechanism 41, and an electronic projector 42 and a memory unit 45 to store image divisions of a three dimensional image Ga to Gp to be projected by the electronic projector 42. The series data of the three-dimensional image Ga to Gp to be stored in the memory unit 45 may be either created by computer graphics or the like or shot by a CCD camera or the like as described later. When a CCD camera is picked up an object, it is also possible to receive, for example, the image data as shown in FIG. 15 from a remote place and to store it in the memory unit 45.

In this configuration, the control unit 43 reads out image data, such as those shown in FIG. 15, from the memory unit 45 and sends them to the electronic projector 42. The electronic projector 42 projects the image data toward the screen 39. In more detail, such image divisions Ga through Gp as shown in FIG. 17 are sequentially projected to the ceiling mirror 38 and, reflected there, projected to the corresponding faces of the conical externally polyhedral mirror 40 and, reflected again there, projected to the screen 39 from directions a to p as shown in FIG. 16.

Figure 26:
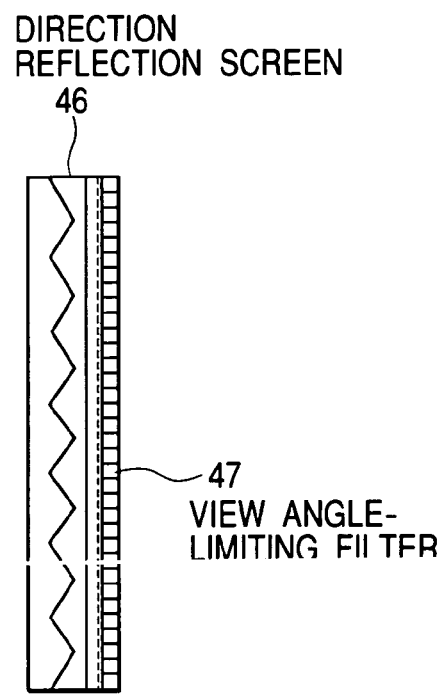
FIG. 26 shows the general configuration of another example of a view angle-limiting filter-attached screen.
Figure 27:
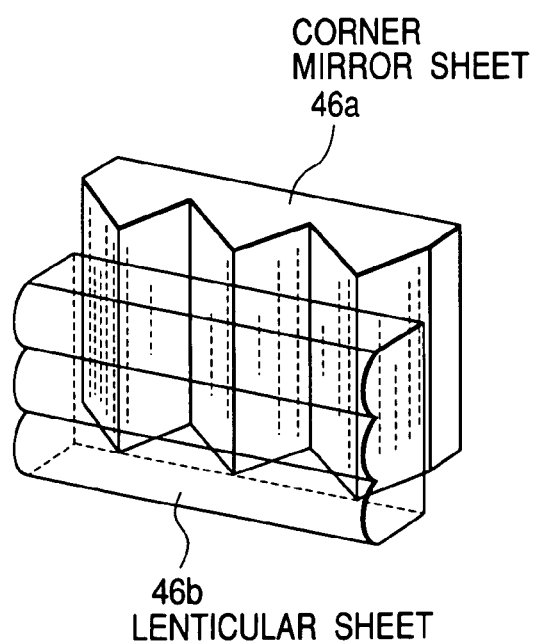
FIG. 27 is a perspective view showing the configuration of a directional reflection screen.

Besides the method shown in FIG. 20, the rotating screen 39 can also use a directional reflection screen material as described in Japanese Patent Laid-open No. 11-258697. FIG. 26 shows how the screen 39 is configured by using a directional reflection material. FIG. 27 shows how the directional reflection material is configured. The directional reflection screen material 46 is composed of a corner mirror sheet 46a and a lenticular sheet 46b. To incident light, the directional reflection screen material 46 shows horizontal retroreflection and vertical diffuse reflection. Incident light is reflected to the incident direction if the angle of incidence is not larger than ±45 degrees. That is, the viewer continues to view the same image until the directional reflection screen 46 rotates ±45 degrees leftward or rightward after the screen is just faced to the viewer. Therefore, as compared with that shown in FIG. 20, the directional reflection screen 46 reflects a larger amount of light since the wider range of angles of incidence causing reflection to the viewer. As a result, the displayed image is brighter than that by the screen shown in FIG. 20.

However, since some of the incident light is reflected to other directions depending on the angle of incidence, image divisions to be viewed only from the corresponding directions may be viewed simultaneously from a signal direction. Accordingly, a view angle-liming filter 47 (shown in FIG. 26) is used to prevent the viewer from receiving reflected light from other directions so that the viewer views only the image division to be rendered to the direction of the viewer. Similar to that shown in FIGS. 19 and 20, this view angle-limiting filter 47 is an array of pitches arranged with a fine pitch. For example, if a view angle-limiting filter that limits the view angle (viewable range) to ±24 degrees from the normal direction is attached to the surface of the directional reflection screen 46, reflected light from adjacent image divisions can be shielded, allowing the viewer to view only a single image division from the corresponding direction, one of a to p shown in FIG. 16. As a result, one or more persons moving around across the directions a to p can view a three-dimensional image of an object, composed of image divisions Ga to Gp shown in FIG. 17. In addition, it is also possible to form a both-sided screen by bonding two directional reflection screens back to back. A lenticular sheet and a view angle-limiting filter are attached to each side. When using the both-sided screen, unlike a single-sided screen, each image division projected from the corresponding mirror is reflected twice per resolution by the front and rear sides. Therefore, each image division can be viewed for a longer time while the screen is rotating.

Figure 28:
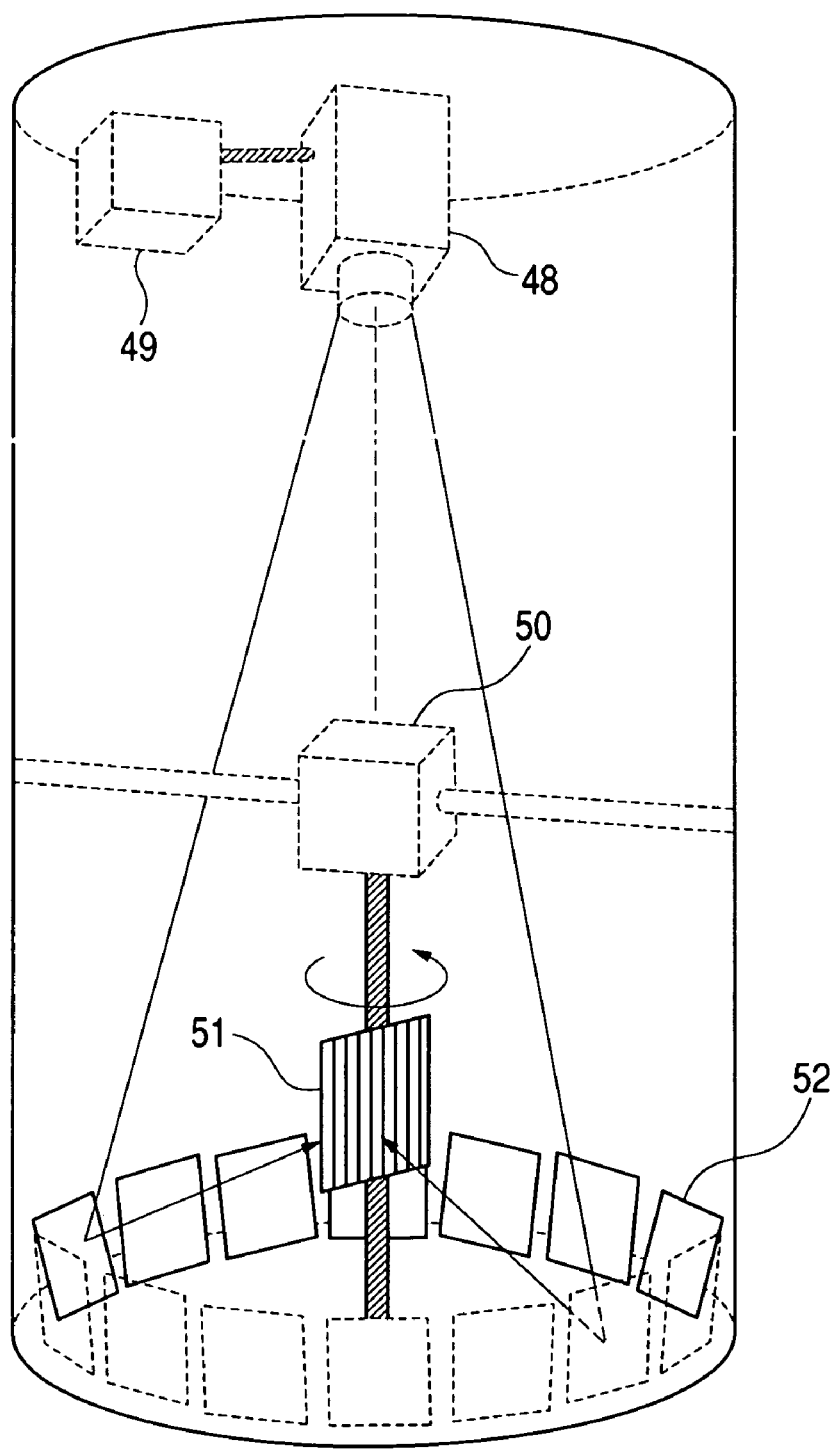
FIG. 28 is a perspective view of a modified display apparatus of the display apparatus according to the fourth embodiment of the present invention.

FIG. 28 is a block diagram of a display apparatus having a projection optical system configured differently from that shown in FIG. 24. Although such components as a view angle-limiting filter-attached screen 51, an electronic projector 48, a rotary mechanism 50, a control unit 49 to control the electronic projector 48, cylindrical internally polyhedral mirror 52 and others are configured in the same manner, the electronic projector 48 is fixed to the ceiling and the rotary mechanism 50 and screen 51 are set up right below the electronic projector 48. Such image divisions Ga to Gp as shown in FIG. 17 are sequentially projected from the electronic projector 48 to the corresponding faces of the cylindrical internally polyhedral mirror 52 and, reflected there, projected to the screen 51 from directions a to p as shown in FIG. 16.

Either the fourth embodiment or second embodiment allows more than one persons to simultaneously enjoy a three-dimensional image from any direction. However, the second embodiment must be adjusted so that the faces of the cylindrical internally polyhedral mirror (mirror group) are accurately faced to the corresponding facets of the conical externally polyhedral mirror. In the case of the fourth embodiment, such adjustment is not required and errors due to subtle deviations of the mirror in position and attitude is small. The second embodiment is characterized in that since nothing is set up above the screen, the image is more felt as floating there. However, since both internal and external mirror groups require considerably large diameters, the second embodiment occupies a larger space and imposes a larger distance between the screen and the viewers than the fourth embodiment.

As understood from the two examples of the fourth embodiment mentioned above, the electronic projector may be set up either above or below the rotary shaft of the screen. In the former case, projection is made downward from the projector while projection is made upward in the latter case. In addition, its vertical positions in the figures merely show its altitudinal relations with the rotary shaft and image for the purpose of facilitating understanding. Further, its vertical position is not restricted by the altitudinal relation between the floor and ceiling where the display apparatus is set up.

Fifth Embodiment

Figure 29:
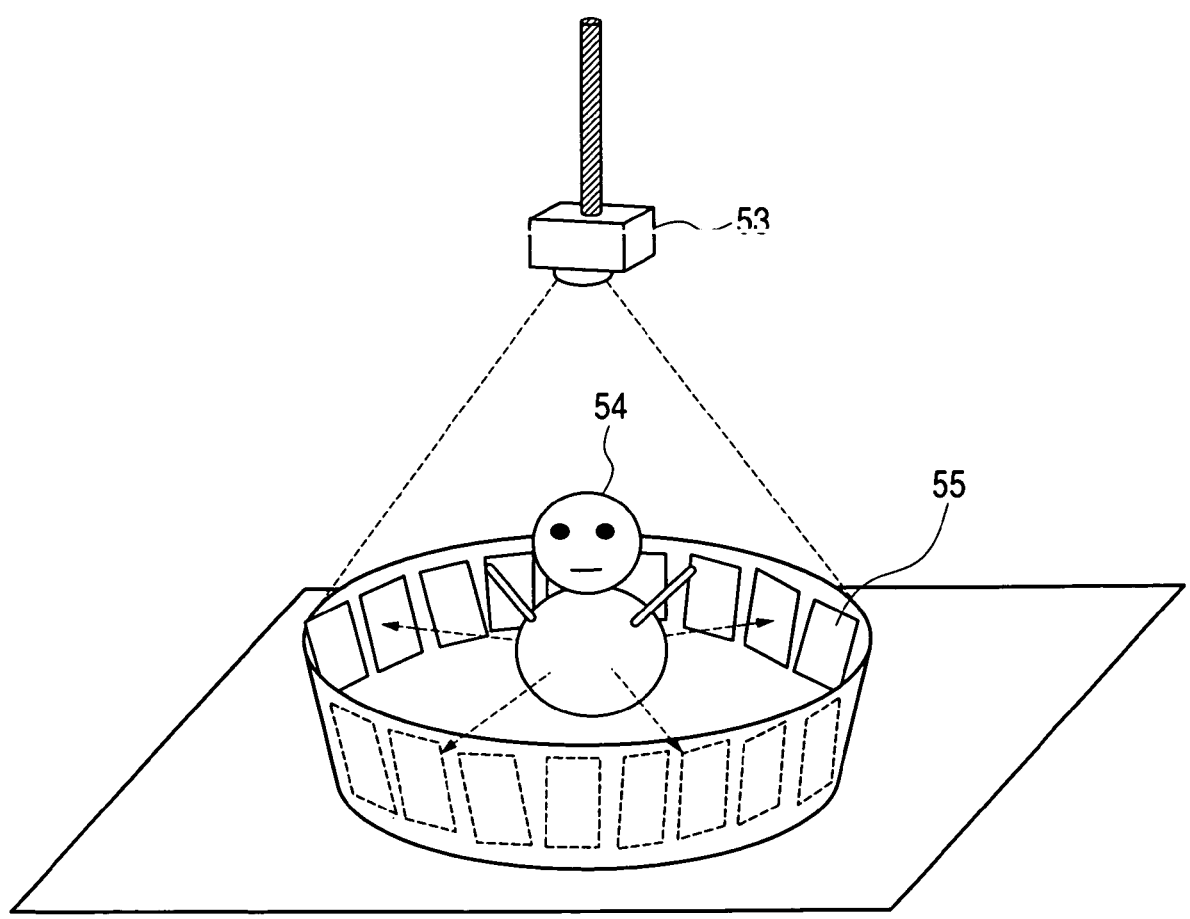
FIG. 29 is a perspective view of an image pickup apparatus according to a fifth embodiment of the present invention.

With reference to FIGS. 15, 16 and 29 to 31, the following describes a fifth embodiment of the present invention, an image pickup device capable of shooting an object from plural directions at once. For example, such image divisions Ga to Gp shown in FIG. 15 are created at once. FIG. 29 shows the principle of the image pickup method. A cylindrical internally polyhedral mirror 55 is arranged circularly in the same manner as the cylindrical internally polyhedral mirror 40 of the second embodiment. An optical image pickup device (CCD camera) 55 is set up above the cylindrical internally polyhedral mirror 55. An object 54 is placed within the circle of the cylindrical internally polyhedral mirror 55. Then, the image divisions of the object 54, viewed from the respective directions a to p as shown in FIG. 16, are reflected by the faces of the cylindrical internally polyhedral mirror 55 and picked up by the CCD camera 53. The image divisions picked up by the CCD camera 53 are as shown in FIG. 15. Either still or moving images can be picked up by the CCD camera 53.

In FIG. 31, the apparatus is configured so as to pick up a whole image of a human body. In this configuration, a cylindrical internally polyhedral mirror 64, a CCD camera 63 and a ceiling mirror 62 are set up as shown in FIG. 31 and a human being or the object of image pickup enters into the circle of the cylindrical internally polyhedral mirror 64. Then, the image divisions of the object 54, viewed from the respective directions a to p as shown in FIG. 16, are reflected by the faces of the cylindrical internally polyhedral mirror 25 and reflected again by the ceiling mirror 62 before picked up by the CCD camera 53. The image divisions are picked up by the CCD camera 53 are as shown in FIG. 15. In this case, any number of objects of any kinds can be shot as long as they can be entered into the circle of the cylindrical internally polyhedral mirror 64.

Figure 30:
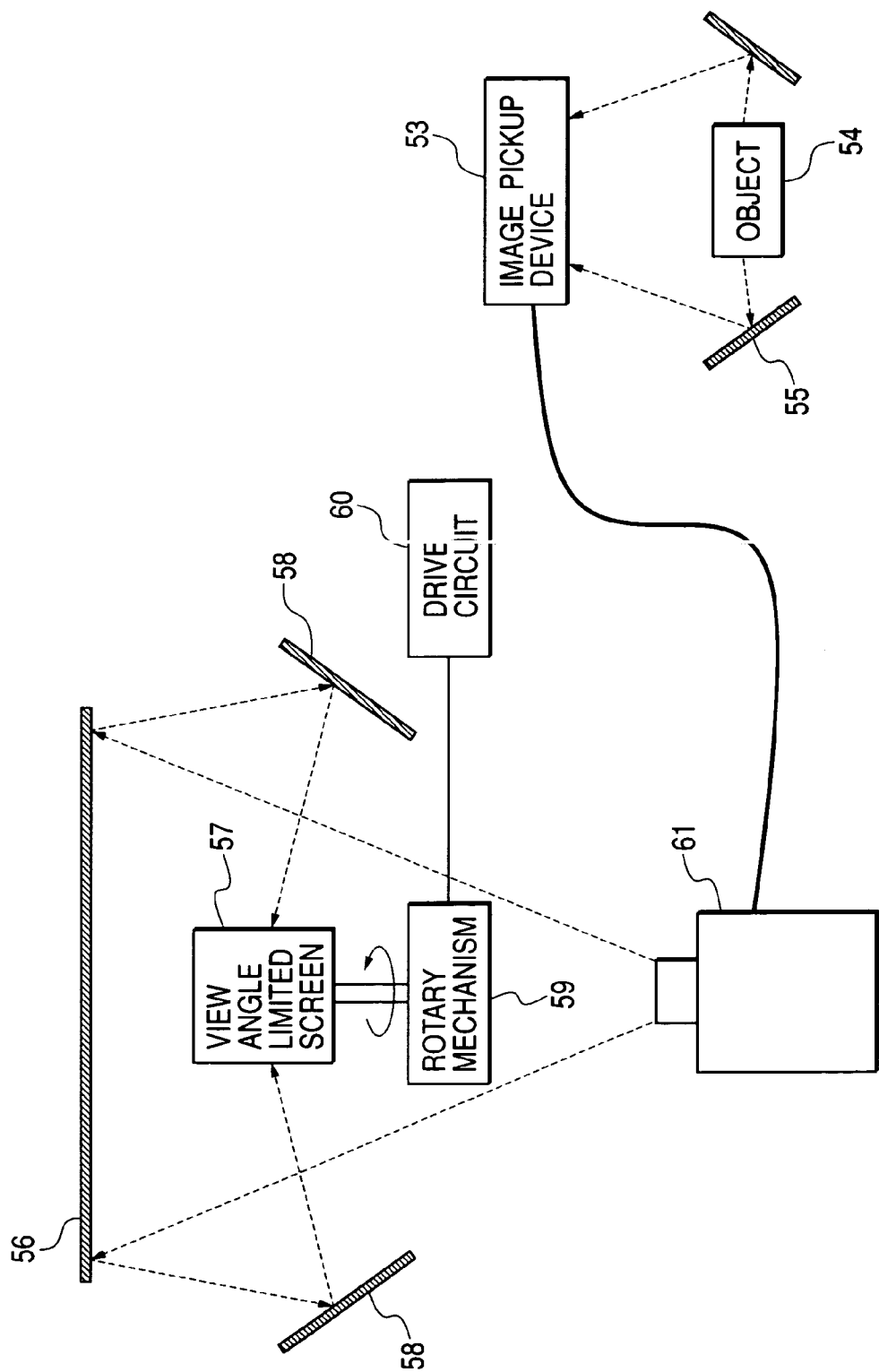
FIG. 30 is a general block diagram of a three-dimensional image transmission system employed in the image pickup apparatus according to the fifth embodiment of the present invention.

FIG. 30 is a block diagram of real-time three-dimensional image transmission between the CCD camera 53 in the above-mentioned image pickup apparatus and the electronic projector 61 in a display apparatus. From a communication unit of the image pickup apparatus, images picked up by the CCD camera are sent in the NTSC/PAL or other formats to the projector 61. Either cable or radio communication is possible. It is also possible to send acquired images to a remote place via a network. A display apparatus in the remote place can display the received images. In addition, the received images can be displayed as moving images if they were picked up as moving images.

Further, the principle of this image pickup apparatus allows its size to be adapted to the size of the object. That is, the image apparatus can be optimized to the object by designing the size of each face of the cylindrical internally polyhedral mirror and the diameter of the mirror according to the size of the object. To pick up such image divisions as shown in FIG. 15 from the cylindrical internally polyhedral mirror, the height of the CCD camera is adjusted so as to fully cover the mirror.

Sixth Embodiment

Figure 32:
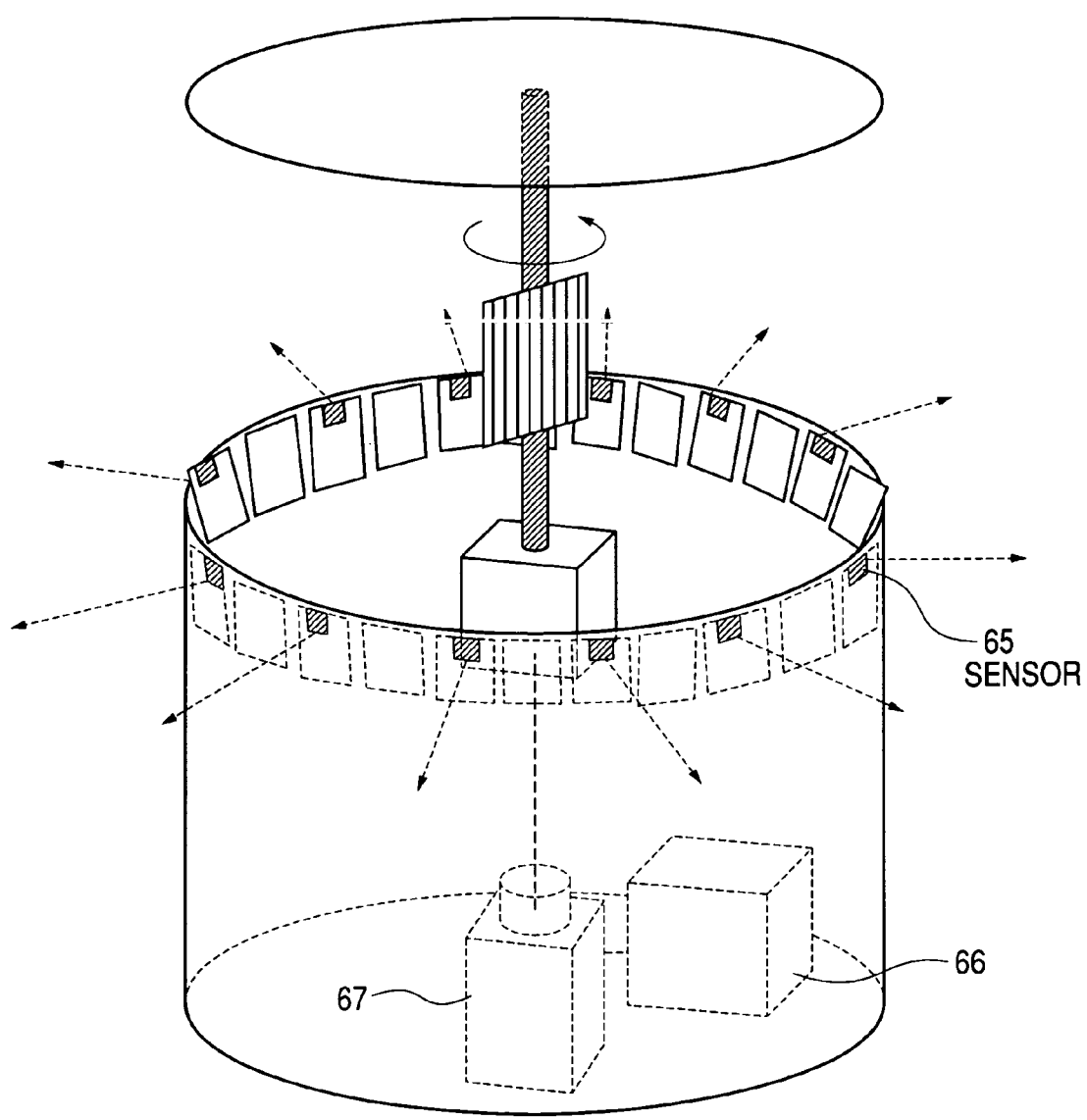
FIG. 32 is a perspective view of a display apparatus provided with an interaction function according to a sixth embodiment of the present invention.

With reference to FIGS. 15 to 17 and 32, the following describes an interaction function of a display apparatus according to a sixth embodiment of the present invention. FIG. 32 is a perspective view of the display apparatus provided with the interaction function. As shown in FIG. 32, it is possible to detect an approaching person if proximity sensors are mounted on the outer surface of the display apparatus or mat switches are laid out on the floor. It is also possible to detect the direction of the viewer (for example, one of a to p as shown in FIG. 16) by using as many sensors, such as infrared ray sensors, proximity sensors and microphones, as the directions to be detected (for example, 16 directions a to p). In this case, the movement of the viewer can be detected roughly from the differences among the signals acquired from adjacent sensors.

Signals from sensors 65 are processed by a control unit 66. Images responding to the viewer's movement are sent by the control unit 66 to an electronic projector 67. For example, it is possible to provide such an interaction that a character projected to the screen is turned to face an approaching person according to his approaching direction detected from sensor signals. The image of the character, such as that shown in FIG. 15, can be turned by successively shifting its image divisions Ga to Gp such as those of FIG. 17 stored in the control unit 66 one or more divisions circularly at a time before they are projected by the electronic projector 67. It is also possible to display its front image division to the direction of the detected person according to the stored directional information about the image divisions.

In addition, it is possible to provide such an interaction that the direction of the character is changed in response to the direction and the movement to which, for example, the viewer's hand moved and which are detected from the differences among the signals from adjacent sensors. Further, it is also possible to detect approaching plural persons and their motions and generate images in response to them if more sensors are set.

Seventh Embodiment

With reference to FIGS. 15 to 17 and 33 to 35, the following describes a semi-cylindrical display apparatus according to a seventh embodiment of the present invention capable of displaying a three-dimensional image.

Figure 33:
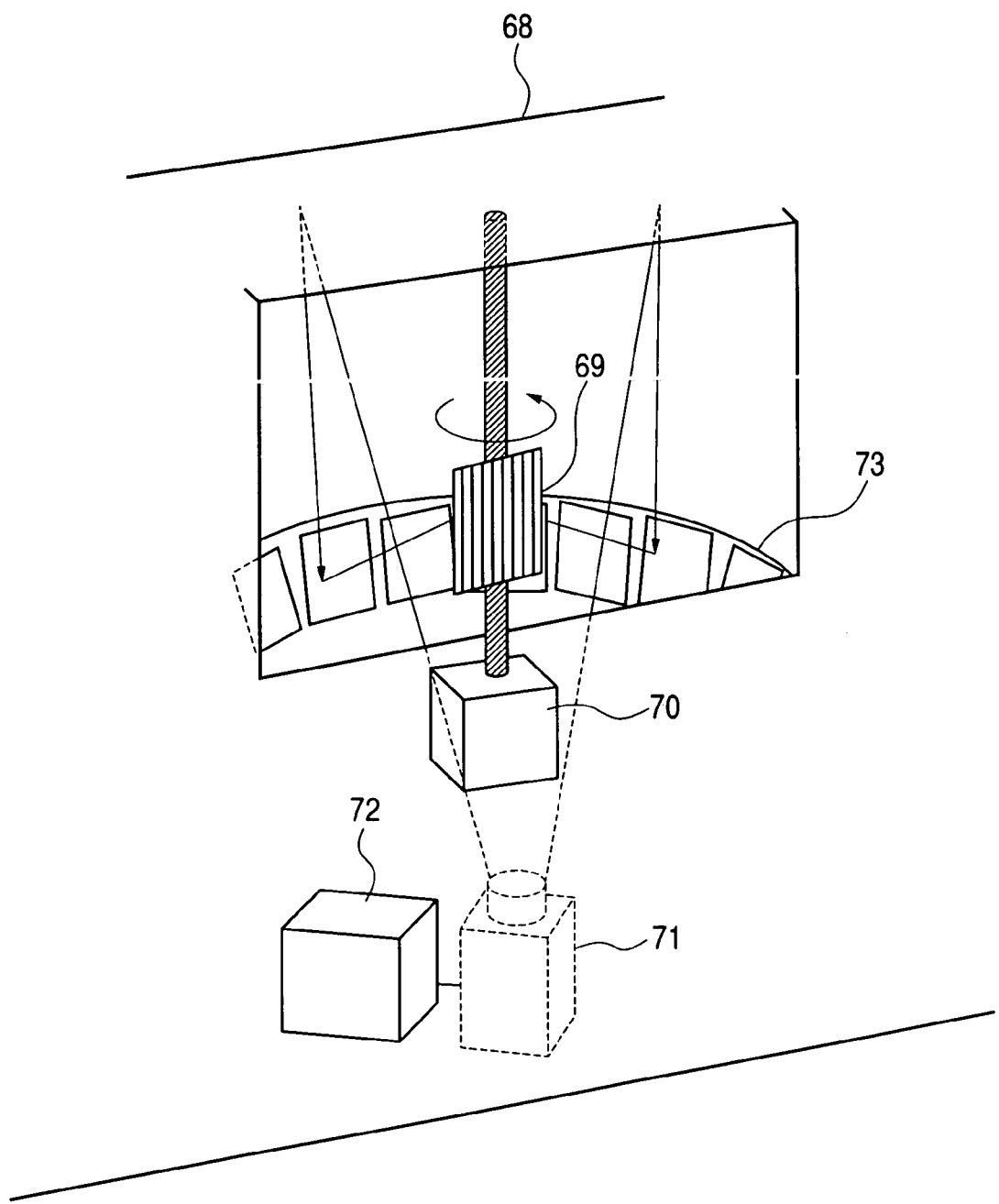
FIG. 33 is a perspective view of a display apparatus according to a seventh embodiment of the present invention.
Figure 34:
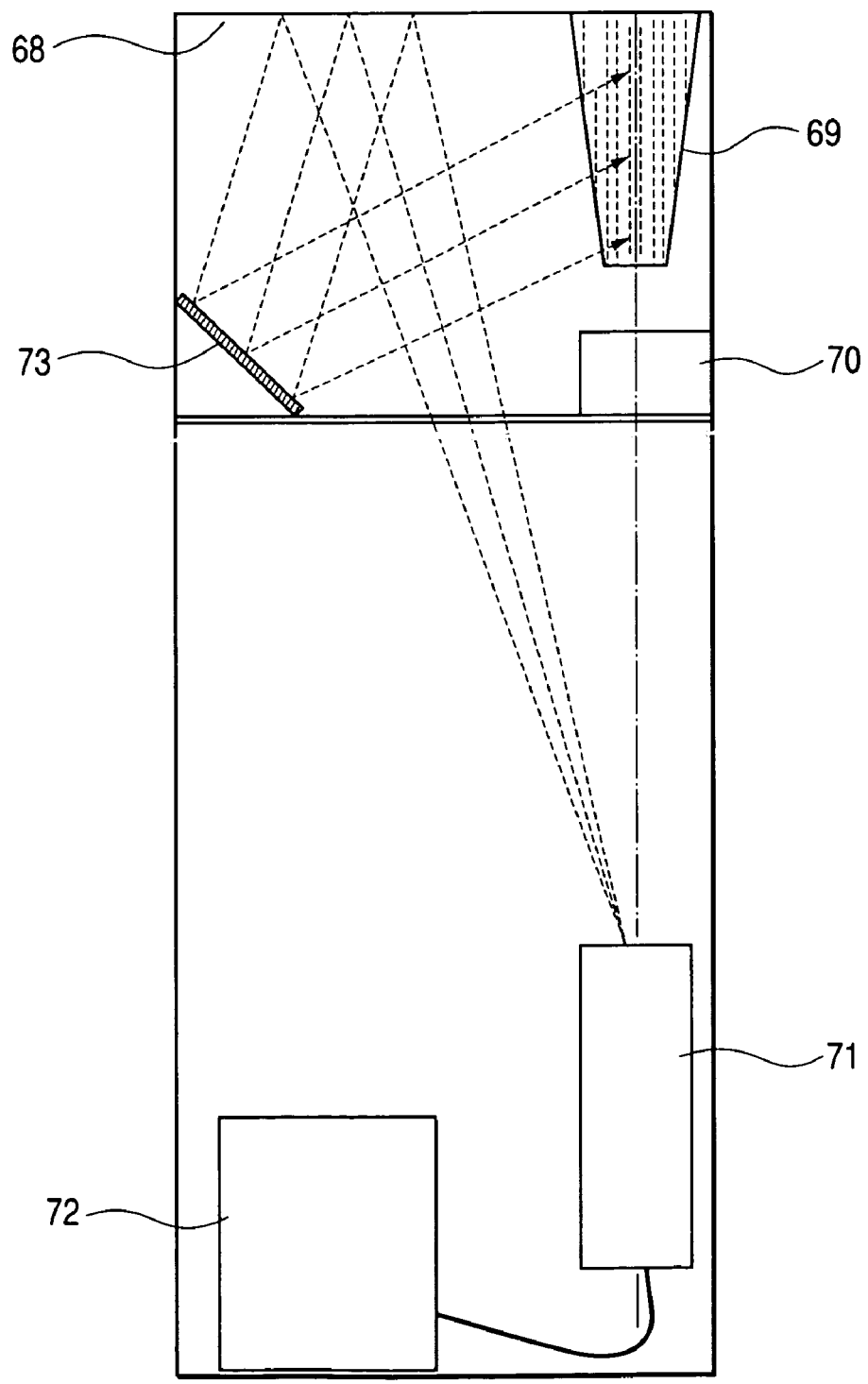
FIG. 34 is a general side view of the display apparatus of the seventh embodiment.
Figure 35:
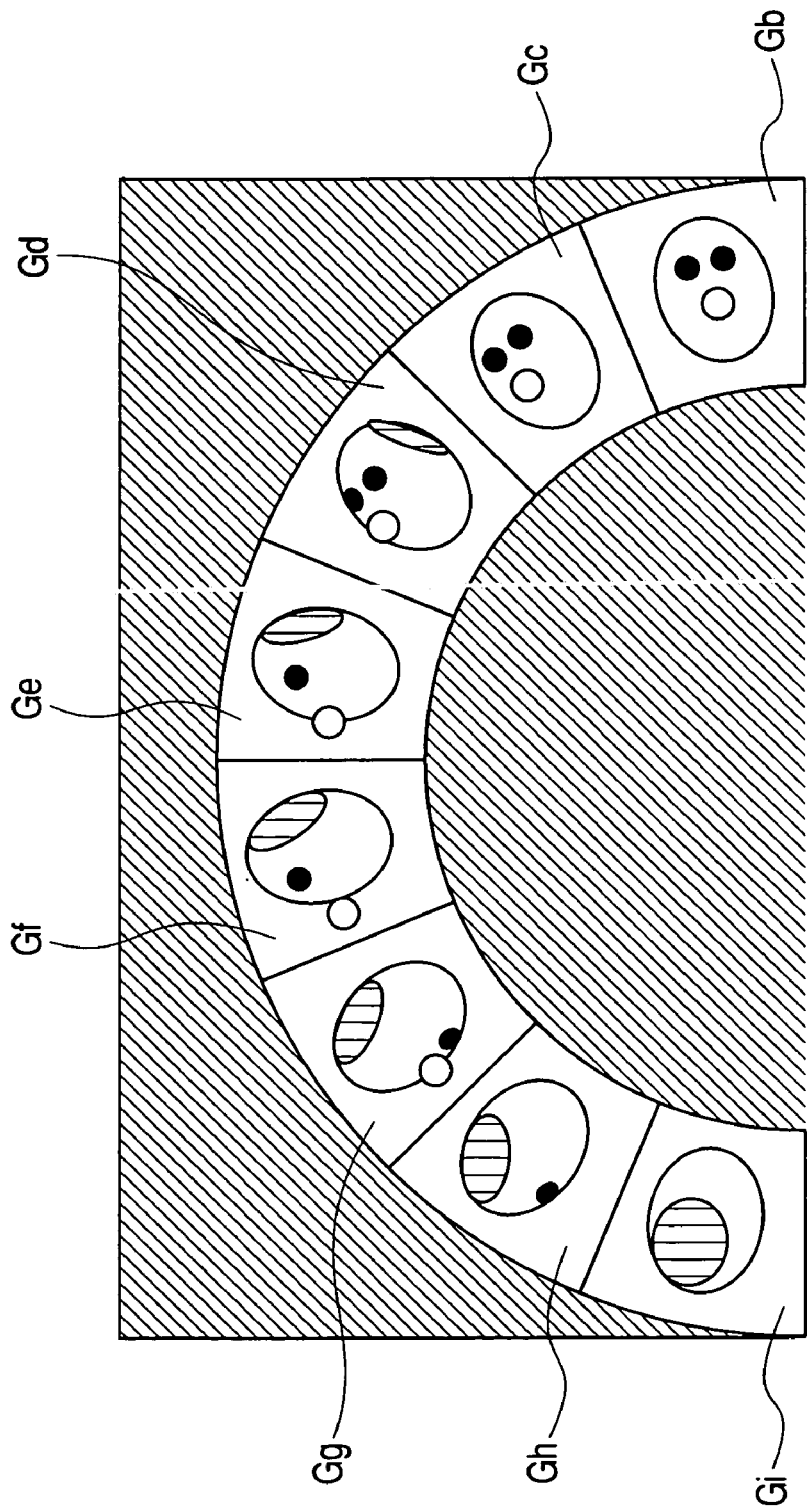
FIG. 35 shows eight image divisions projected to a rotating screen from an electronic projector included in the display apparatus of the seventh embodiment.

FIG. 33 is a perspective view of the semi-cylindrical display apparatus. FIG. 34 is a general side view of the display apparatus. A view angle-limiting filter-attached screen 69 is rotated continuously or stepwise by a rotary mechanism (rotary drive source) 70. Reference numeral 73 denotes a semi-cylindrical internally polyhedral mirror (mirror group). Reference numeral 68 is a mirror attached to the inner side of the ceiling of the display apparatus. These mirrors 68 and 73 form a projection optical system. Reference 71 is an electronic projector which projects such image data as shown in FIG. 35. Reference numeral 72 is a control unit that stores image data and sends image data to the electronic projector 71.

FIG. 35 shows image divisions Gb to Gi (those shown in FIG. 17) which constitute a three-dimensional image of an object viewed around the object. They are arranged semi-circularly in a ring area. The images in FIG. 35 may be either created freely by computer graphics or the like or shot (pick up) by a CCD camera or the like as described in the fifth embodiment.

In this configuration, the control unit 72 reads out and sends image data, such as those shown in FIG. 35, to the electronic projector 71. The electronic projector 71 projects the received image data so that they are displayed on the screen 69. The image divisions Gb through Gi projected from the ring area are reflected by the ceiling mirror 68 to the corresponding faces of the semi-cylindrical internally polyhedral mirror (mirror group) 73 and, reflected again there, projected to the screen 69 respectively from the corresponding directions b to i as shown in FIG. 16. The rotary screen 69 has the property of transmitting an image projected to the rear surface. To allow a different image to be viewed depending on the viewing direction, its horizontal view angle should be limited and it should have a vertically wide range of viewing angles. Therefore, the screen is made of such a semi-transmitting diffusion film as used by rear projection displays.

The screen 69 may be implemented by using a Fresnel lens. FIG. 36 shows the feature of the Fresnel lens. The Fresnel lens has not a continuously curved surface but a stepped surface. As shown in FIG. 36, light is refracted by stepped parts to condense transmitted light to the same direction as the incident direction of light. In the viewing angle, commercially available Fresnel lenses vary up to about ±60 degrees. If a Fresnel lens screen is used, since light is transmitted to the same direction as the incident direction and condensed to a predetermined position, the viewer can view an image being projected to a face of the semi-cylindrical inner polyhedral mirror 73 when he is at a position along the line connecting the face and the Fresnel lens screen. That is, similar to the retroreflection described with the fourth embodiment, using a Fresnel lens allows the viewer to view the image corresponding to the viewing direction. In addition, the viewer can continue to view the same image while the angle of the Fresnel lens screen is within a certain range (of viewing angle) relative to the viewing direction. FIG. 37 shows two types of Fresnel lenses. Reference numeral 74a is the most popular and has a surface cut concentrically. The lens 74a condenses light both horizontally and vertically. Thus if this lens is used as the screen 69 in the display apparatus of the seventh embodiment, the image reflected by each face of the internally polyhedral mirror 73 can be viewed only within the view angle range of the Fresnel lens both horizontally and vertically. Therefore, using a Fresnel lens 74b having a surface cut only horizontally is considered appropriate as the material of the screen 69 since it condenses light only horizontally.

Figure 38:
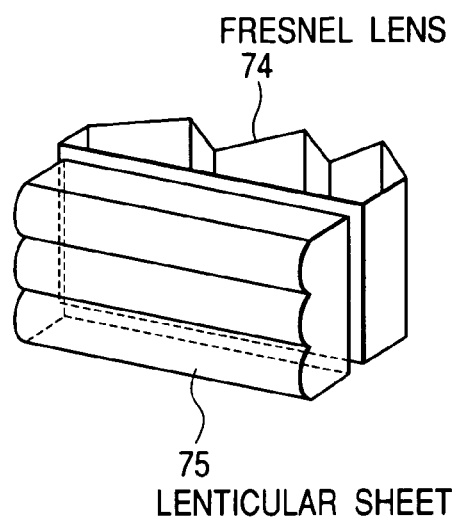
FIG. 38 shows a configuration to realize vertical diffusive reflection by using a Fresnel lens.

To suppress the vertical condensing in order to allow an image to be viewed from a wider range, the screen is configured so as to vertically cause diffusive reflection. FIG. 38 is a structure to let the Fresnel lens perform diffusive reflection vertically. By attaching (sticking) a lenticular sheet 75, which is similar to the lenticular sheet 46b shown in FIG. 27, to the surface of the Fresnel, vertical diffusive reflection can be realized. This makes the whole screen uniformly bright in the vertical direction, resulting in an easier-to-view image displayed.

Figure 39:
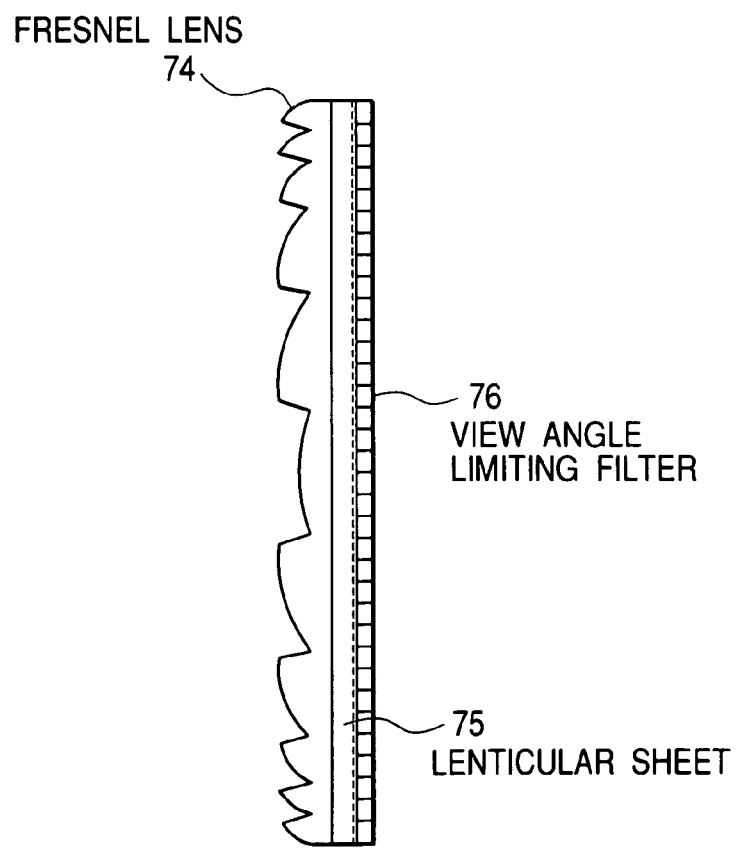
FIG. 39 is a general side view showing the configuration of a screen employed in the display apparatus of the seventh embodiment.

FIG. 39 is a structure (top view) of the screen 69 using a Fresnel lens. The lenticular sheet 75 shown in FIG. 38 is attached to the Fresnel lens in order to cause diffusive reflection vertically. Further, in order to limit the viewing angle, fins are attached in the same manner as the view angle-limiting filter shown in FIG. 20 or such a view angle-limiting filter as used for the liquid crystal displays of PCs, mobile phones is attached.

Unlike in the first, second and fourth embodiments, the image to be viewed is projected from the rear in the seventh embodiment described so far. Therefore, flickering is suppressed since fin edges in the view angle-limiting filter are not directly lit up. This results in a high contrast image displayed. In addition, although the viewer cannot fully moves around the seventh embodiment, the viewer can get closer to the screen since the internally polyhedral mirror is semi-cylindrical as compared with the cylindrical display apparatus of the first, second and fourth embodiments. To enlarge the screen and the image displayed on the screen in the cylindrical display apparatus of each of the first, second and fourth embodiments, the scale of the whole apparatus must be enlarged, resulting in a longer distance between the user and the screen. In the case of the seventh embodiment, the scale of the whole apparatus can be enlarged without making longer the distance between the viewer and the screen.

In the first, second and fourth embodiments, image divisions such as Ga to Gp (16 divisions) shown in FIG. 15 are arranged circularly in a ring area and projected from an electronic projector. In the seventh embodiment, image divisions such as those (8 divisions) shown in FIG. 35 are arranged semi-circularly in a ring area and projected. Therefore, if both are projected with the same resolution, the number of image divisions required in the seventh embodiment is half that required in the other embodiments. This means that since the resolution of each image division projected by the electronic projector in seventh embodiment is four times as high as that in the first, second and fourth embodiments, the seventh embodiment has higher power of expression.

Note that although the internally polyhedral mirror is assumed to form half of a circle in the above description of the seventh embodiment, it may also be extended or reduced so as to form a larger or smaller part of the circle. The angular range of the three dimensional image which can be viewed is determined by the angular range covered by the mirror arranged cylindrically. By using a light transmittance low reflection screen, it is also possible to form a fully cylindrical display apparatus like in the second and fourth embodiments.

What is claimed is:

1. A display apparatus, comprising:
   a display unit having a view angle-limiting filter on a surface thereof;
   a rotary mechanism which rotates the display unit;
   a rotation range detection unit which detects a plurality of rotation ranges in one rotation of the display unit which is rotated by the rotary mechanism; and
   a control unit which transmits information or image corresponding to each of the plurality of rotation ranges detected by the rotation detection unit to the display unit to display the information or the image on the surface of the display unit having the view angle limiting filter.

2. The display apparatus according to claim 1 wherein in the control unit, the information or the images are mutually different corresponding to the each of the plurality of rotation ranges detected by the rotation detection unit.

3. A display apparatus, comprising:
A display unit having a view angle-limiting filter on a surface thereof;
a rotary mechanism which rotates the display unit;
a rotation range detection unit which detects a plurality of rotation ranges in one rotation of the display unit which is rotated by the rotary mechanism;
a viewer detection unit which detects a direction extending through a viewer; and
a control until which transmits suitable information or suitable image for the direction extending through the viewer detected by the viewer detection unit to the display unit when the rotation range of the display unit detected by the rotation range detection unit is faced to the detected direction, to display the suitable information or the image on the surface of the display unit having the view angle-limiting filter.

4. The display apparatus according to claim 1 wherein the display unit comprises a display which receives the information or the image transmitted by the control unit to display the information or the image.

5. The display apparatus according to claim 3 wherein the display unit comprises a display which receives the suitable information or the suitable image transmitted by the control unit to display the suitable information or the suitable image.

6. A display apparatus according to claim 1 wherein the display unit comprises a display screen to which text or image information is projected by an electronic projector.

7. A display apparatus according to claim 3 wherein the display unit comprises a display screen to which text or image information is projected by an electronic projector.

8. The display apparatus according to claim 1 wherein the control unit includes a memory unit which stores the information or the images corresponding to the plurality of rotation ranges to display on the surface of the display unit, the control unit transmits the information on the image corresponding to each of the plurality of rotation ranges detected by the rotation range detection unit by reading out the information or the image from the memory unit.

9. A display apparatus according to claim 3 wherein the control unit includes a memory unit which stores the information or the image corresponding to the plurality of rotation ranges to display on the surface of the display unit, the control unit transmits the suitable information or the suitable image for the direction extending through the viewer by reading out the suitable information or the suitable image from the memory unit based on the rotation range being faced to the detect direction detected by the rotation range detection unit.

* * * * *